United States Patent
Kench et al.

(10) Patent No.: US 11,546,955 B2
(45) Date of Patent: Jan. 3, 2023

(54) SIDELINK-BASED DEVICE-TO-DEVICE COMMUNICATION

(71) Applicant: QUALCOMM Incorporated, San Diego, CA (US)

(72) Inventors: Amol Kench, San Diego, CA (US); Guttorm Ringstad Opshaug, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 17/178,780

(22) Filed: Feb. 18, 2021

(65) Prior Publication Data

US 2022/0264671 A1    Aug. 18, 2022

(51) Int. Cl.
| | |
|---|---|
| *H04W 4/00* | (2018.01) |
| *H04W 76/14* | (2018.01) |
| *H04W 4/02* | (2018.01) |
| *H04W 4/90* | (2018.01) |

(52) U.S. Cl.
CPC .......... *H04W 76/14* (2018.02); *H04W 4/023* (2013.01); *H04W 4/90* (2018.02)

(58) Field of Classification Search
CPC ........ H04W 76/14; H04W 4/023; H04W 4/90
See application file for complete search history.

(56) References Cited

U.S. PATENT DOCUMENTS

| | | | |
|---|---|---|---|
| 2017/0041942 A1* | 2/2017 | Wallentin | H04W 72/1231 |
| 2017/0142741 A1* | 5/2017 | Kaur | H04W 76/19 |

FOREIGN PATENT DOCUMENTS

| | | | | |
|---|---|---|---|---|
| WO | WO-2016048205 A1 * | 3/2016 | ......... | H04L 41/0803 |

\* cited by examiner

*Primary Examiner* — Erika A Washington
(74) *Attorney, Agent, or Firm* — Thien T. Nguyen

(57) ABSTRACT

A UE is configured to: obtain one or more action criteria values and one or more corresponding indications of one or more actions; receive a wireless sidelink signal; determine one or more evaluation characteristic values of one or more evaluation characteristics that include one or more communication characteristics of the wireless sidelink signal; determine a portion of the one or more action criteria values that corresponds to the one or more evaluation characteristic values; and perform the one or more actions corresponding to the portion of the one or more action criteria values, where the one or more actions include providing an indication to the user interface to produce an output, or sending a sidelink response wirelessly via the wireless interface, or a combination thereof.

22 Claims, 18 Drawing Sheets

800

|  | Medical emergency | Family emergency | Product offer | Product request | Service offer | Service request | Spouse |
|---|---|---|---|---|---|---|---|
| Busy | X | X |  |  |  |  | Busy reply |
| At work | X | X |  |  |  |  | X |
| At home |  | X | Display | Display |  | X | X |
| In meeting | X | X |  |  |  |  |  |
| On phone | ACK, ETA | X |  |  |  |  |  |
| On vacation | X | X |  |  | X |  | X |
| Invisible |  | X |  |  |  |  |  |
| Driving | X | X |  |  |  | X | X |

|  | Family emergency | | | Medical emergency | |
|---|---|---|---|---|---|
|  | Medical | Non-medical, human | Non-medical, pet | CPR | Allergic reaction |
| Busy | X | X | X | X |  |
| At work | X | X |  | X |  |
| At home | X | X | X | X |  |
| In meeting | X |  |  | X |  |
| On phone | X |  |  | X |  |
| On vacation | X | X | X | X |  |
| Invisible | X |  |  |  |  |
| Driving | X | X | X | X |  |

FIG. 9

SIDELINK-BASED DEVICE-TO-DEVICE COMMUNICATION

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Obtaining the locations of mobile devices that are accessing a wireless network may be useful for many applications including, for example, emergency calls, personal navigation, asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

Network-based communications are often used for various applications. For example, emergency calls may be placed from user equipment to a network to contact emergency service personnel and obtain emergency services. As another example, user equipment may be used to post advertisements or information to websites, such as social media websites, for widespread access.

SUMMARY

In an embodiment, a UE (user equipment) includes: a user interface; a wireless interface configured to send and receive wireless signals; a memory; and a processor communicatively coupled to the user interface, the wireless interface, and the memory, and configured to: obtain one or more action criteria values, of one or more action criteria, and one or more corresponding indications of one or more actions; receive a wireless sidelink signal via the wireless interface; determine one or more evaluation characteristic values of one or more evaluation characteristics that include one or more communication characteristics of the wireless sidelink signal; determine a portion of the one or more action criteria values that corresponds to the one or more evaluation characteristic values, the portion of the one or more action criteria values comprising one or more of the one or more action criteria values; and perform, in response to determining the portion of the one or more action criteria values that corresponds to the one or more evaluation characteristic values, the one or more actions corresponding to the portion of the one or more action criteria values that corresponds to the one or more evaluation characteristic values, wherein the one or more actions include providing an indication to the user interface to produce an output, or sending a sidelink response wirelessly via the wireless interface, or a combination thereof.

Implementations of such a UE may include one or more of the following features. The one or more action criteria comprise a communication source, or a communication type, or any combination thereof. The one or more action criteria comprise a status of a user of the UE, or a status of the UE, or a combination thereof. The portion of the one or more action criteria values is a first portion of the one or more action criteria values, and the processor is further configured to perform the one or more actions corresponding to the first portion of the one or more action criteria values based on the first portion of the one or more action criteria values having a higher priority than a second portion of the one or more action criteria values, wherein the second portion of the one or more action criteria values also corresponds to the one or more evaluation characteristic values. The processor is configured to determine a source of the wireless sidelink signal, or a communication type of the wireless sidelink signal, or a combination thereof, as the one or more evaluation characteristic values. The processor is configured to: instruct the user interface to produce a request for user input as to one or more skills of the user, or one or more interests of the user, or one or more permissions corresponding to one or more wireless sidelink signal characteristics, or any combination thereof; receive the user input from the user interface; and store, in the memory, one or more indications corresponding to the user input as at least part of the one or more action criteria values. The processor is configured to respond to determining the portion of the one or more action criteria values that corresponds to the one or more evaluation characteristic values by sending a plurality of wireless sidelink responses to the wireless sidelink signal via the wireless interface, and each of the plurality of wireless sidelink responses includes an indication of a location of the UE, or an indication of an estimated travel time between the location of the UE and a location of a source of the wireless sidelink signal, or a combination thereof.

In an embodiment, a UE includes: means for obtaining one or more action criteria values, of one or more action criteria, and one or more corresponding indications of one or more actions; means for receiving a wireless sidelink signal; means for determining one or more evaluation characteristic values of one or more evaluation characteristics that include one or more communication characteristics of the wireless sidelink signal; means for determining a portion of the one or more action criteria values that corresponds to the one or more evaluation characteristic values, the portion of the one or more action criteria values comprising one or more of the one or more action criteria values; and means for performing, in response to determining the portion of the one or more action criteria values that corresponds to the one or more evaluation characteristic values, the one or more actions corresponding to the portion of the one or more action criteria values that corresponds to the one or more evaluation characteristic values, wherein the one or more actions include providing an indication of the wireless sidelink signal to a user of the UE, or sending a sidelink response wirelessly, or a combination thereof.

Implementations of such a UE may include one or more of the following features. The one or more action criteria comprise a communication source, or a communication type, or any combination thereof. The one or more action criteria comprise a status of a user of the UE, or a status of the UE, or a combination thereof. The portion of the one or more action criteria values is a first portion of the one or more action criteria values, and wherein the means for performing the one or more actions include means for performing the one or more actions corresponding to the first portion of the one or more action criteria values based on the first portion of the one or more action criteria values having a higher priority than a second portion of the one or more action criteria values, wherein the second portion of the one or more action criteria values also corresponds to the one or more evaluation characteristic values. The means for determining the one or more evaluation characteristic values include means for determining a source of the wireless sidelink signal, or a communication type of the wireless sidelink signal, or a combination thereof, as the one or more evaluation characteristic values. The UE includes: means for producing a request for user input as to one or more skills of the user, or one or more interests of the user, or one or more permissions corresponding to one or more wireless sidelink signal characteristics, or any combination thereof means for receiving the user input; and means for storing one or more indications corresponding to the user input as at least part of the one or more action criteria values. The UE includes means for responding to determining the portion of the one or more action criteria values that corresponds to the one or more evaluation characteristic values by sending a plurality of wireless sidelink responses to the wireless sidelink signal, and each of the plurality of wireless sidelink responses includes an indication of a location of the UE, or an indication of an estimated travel time between the location of the UE and a location of a source of the wireless sidelink signal, or a combination thereof.

In an embodiment, a method of sidelink communication at a UE includes: obtaining, at the UE, one or more action criteria values, of one or more action criteria, and one or more corresponding indications of one or more actions; receiving, at the UE, a wireless sidelink signal; determining, at the UE, one or more evaluation characteristic values of one or more evaluation characteristics that include one or more communication characteristics of the wireless sidelink signal; determining, at the UE, a portion of the one or more action criteria values that corresponds to the one or more evaluation characteristic values, the portion of the one or more action criteria values comprising one or more of the one or more action criteria values; and performing, at the UE in response to determining the portion of the one or more action criteria values that corresponds to the one or more evaluation characteristic values, the one or more actions corresponding to the portion of the one or more action criteria values that corresponds to the one or more evaluation characteristic values, wherein the one or more actions include providing an indication of the wireless sidelink signal to a user of the UE, or sending a sidelink response wirelessly, or a combination thereof.

Implementations of such a method may include one or more of the following features. The one or more action criteria comprise a communication source, or a communication type, or any combination thereof. The one or more action criteria comprise a status of a user of the UE, or a status of the UE, or a combination thereof. The portion of the one or more action criteria values is a first portion of the one or more action criteria values, and wherein performing the one or more actions includes performing the one or more actions corresponding to the first portion of the one or more action criteria values based on the first portion of the one or more action criteria values having a higher priority than a second portion of the one or more action criteria values, and the second portion of the one or more action criteria values also corresponds to the one or more evaluation characteristic values. Determining the one or more evaluation characteristic values includes determining a source of the wireless sidelink signal, or a communication type of the wireless sidelink signal, or a combination thereof, as the one or more evaluation characteristic values. The method includes: producing a request for user input as to one or more skills of the user, or one or more interests of the user, or one or more permissions corresponding to one or more wireless sidelink signal characteristics, or any combination thereof; receiving the user input; and storing, in the UE, one or more indications corresponding to the user input as at least part of the one or more action criteria values. The method includes responding to determining the portion of the one or more action criteria values that corresponds to the one or more evaluation characteristic values by sending a plurality of wireless sidelink responses to the wireless sidelink signal, and each of the plurality of wireless sidelink responses includes an indication of a location of the UE, or an indication of an estimated travel time between the location of the UE and a location of a source of the wireless sidelink signal, or a combination thereof.

In an embodiment, a non-transitory, processor-readable storage medium includes processor-readable instructions to cause a processor, of a UE, to: obtain one or more action criteria values, of one or more action criteria, and one or more corresponding indications of one or more actions; receive a wireless sidelink signal; determine one or more evaluation characteristic values of one or more evaluation characteristics that include one or more communication characteristics of the wireless sidelink signal; determine a portion of the one or more action criteria values that corresponds to the one or more evaluation characteristic values, the portion of the one or more action criteria values comprising one or more of the one or more action criteria values; and perform, in response to determining the portion of the one or more action criteria values that corresponds to the one or more evaluation characteristic values, the one or more actions corresponding to the portion of the one or more action criteria values that corresponds to the one or more evaluation characteristic values, wherein the one or more actions include providing an indication of the wireless sidelink signal to a user of the UE, or sending a sidelink response wirelessly, or a combination thereof.

In an embodiment, a UE includes: an input device comprising a user interface, or a sensor, or a combination thereof; a wireless interface configured to send and receive wireless signals; a memory; and a processor communicatively coupled to the input device, the wireless interface, and the memory, and configured to: obtain triggering information from the input device; and send a sidelink communication via the wireless interface in response to receiving the triggering information from the input device, the sidelink communication including an indication of a location of the UE, and including a request, or an offer, or a notification, or a combination thereof.

Implementations of such a UE may include one or more of the following features. The processor is configured to send a network communication via the wireless interface corresponding to the sidelink communication and based on content of the sidelink communication, or based on a threshold amount of time passing after transmission of the sidelink communication without the processor receiving a response to the sidelink communication, or a combination thereof. The processor is configured to broadcast, multicast, or unicast the sidelink communication based on an offer type of the sidelink communication, or a request type of the sidelink communication, or a notification type of the sidelink communication, or any combination thereof. The processor is configured to send a first instruction to an other UE for the other UE to send a location of the other UE wirelessly and repeatedly. The processor is configured to send a second instruction to the other UE for the other UE to place an emergency call, or to record video, or to record audio, or any combination thereof. The UE includes the user interface, and the processor and the user interface are configured to provide an expiration indication based on a threshold amount of time passing after transmission of the sidelink communication without the processor receiving a response to the sidelink communication, the expiration indication comprising a visual indication, or an audible indication, or a tactile indication, or any combination thereof.

In an embodiment, a UE communication method includes: obtaining triggering information from a user of a UE, or from a sensor of the UE, or a combination thereof; and sending a sidelink communication from the UE in response to receiving the triggering information, the sidelink communication including an indication of a location of the UE, and including a request, or an offer, or a notification, or a combination thereof.

Implementations of such a method may include one or more of the following features. The UE communication method includes sending a network communication corresponding to the sidelink communication from the UE based on content of the sidelink communication, or based on a threshold amount of time passing after transmission of the sidelink communication without the UE receiving a response to the sidelink communication, or a combination thereof. Sending the sidelink communication comprises broadcasting, multicasting, or unicasting the sidelink communication based on an offer type of the sidelink communication, or a request type of the sidelink communication, or a notification type of the sidelink communication, or any combination thereof. The UE is a first UE, and the method includes sending a first instruction from the first UE to a second UE for the second UE to send a location of the second UE wirelessly and repeatedly. The UE communication method includes sending a second instruction to the second UE for the second UE to place an emergency call, or to record video, or to record audio, or any combination thereof. The UE communication method includes providing an expiration indication to a user of the UE of a threshold amount of time passing after transmission of the sidelink communication without the UE receiving a response to the sidelink communication, the expiration indication comprising a visual indication, or an audible indication, or a tactile indication, or any combination thereof.

In an embodiment, a UE includes: means for obtaining triggering information from a user of the UE, or from a sensor of the UE, or a combination thereof; and means for sending a sidelink communication from the UE in response to receiving the triggering information, the sidelink communication including an indication of a location of the UE, and including a request, or an offer, or a notification, or a combination thereof.

Implementations of such a UE may include one or more of the following features. The UE includes means for sending a network communication corresponding to the sidelink communication from the UE based on content of the sidelink communication, or based on a threshold amount of time passing after transmission of the sidelink communication without the UE receiving a response to the sidelink communication, or a combination thereof.

In an embodiment, a non-transitory, processor-readable storage medium includes processor-readable instructions to cause a processor of a UE to: obtain triggering information from a user of the UE, or from a sensor of the UE, or a combination thereof; and send a sidelink communication from the UE in response to receiving the triggering information, the sidelink communication including an indication of a location of the UE, and including a request, or an offer, or a notification, or a combination thereof.

Implementations of such a storage medium may include one or more of the following features. The storage medium includes processor-readable instructions to cause the processor to send a network communication corresponding to the sidelink communication from the UE based on content of the sidelink communication, or based on a threshold amount of time passing after transmission of the sidelink communication without the processor receiving a response to the sidelink communication, or a combination thereof.

BRIEF DESCRIPTION OF THE DRAWINGS

FIG. 8 is an example of an action criteria set.

FIG. 9 is an example of an action criteria set including sub-criteria values.

DETAILED DESCRIPTION

Figure 1:
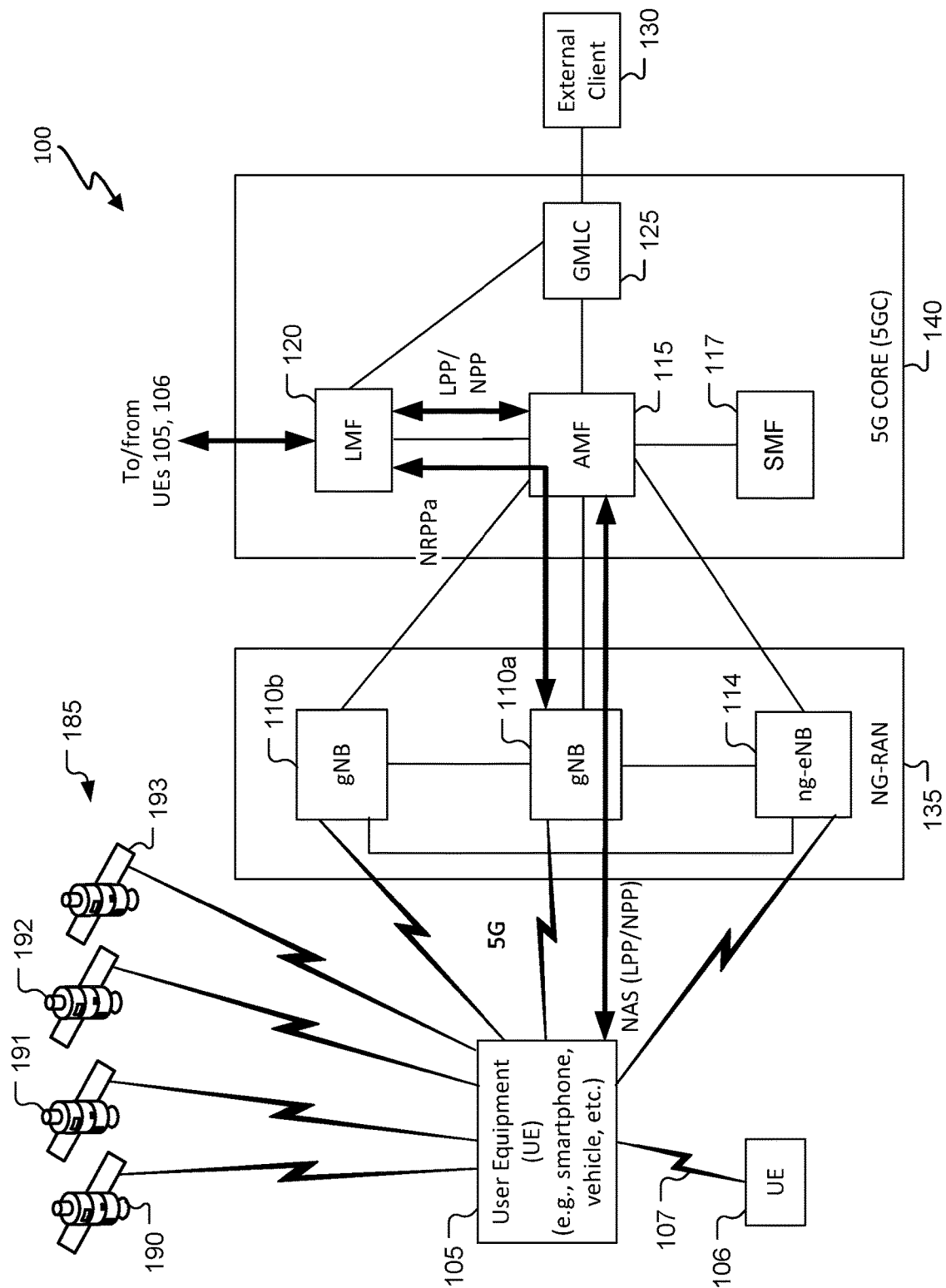
FIG. 1 is a simplified diagram of an example wireless communications system.

Techniques are discussed herein for using sidelink signaling (also called sidelink communication). Sidelink communications may be sent from device to device without going through a network entity (e.g., a cellular network base station). The sidelink communications may reach devices within sidelink communication range of the sending device quickly, facilitating communications relevant to an area near the sending device and/or relevant to users of other devices near the sending device. A receiving device may evaluate an incoming sidelink signal to determine whether to take one or more actions based on whether one or more criteria are met. One or more of the criteria may be based on sidelink communication (e.g., communication type, communication source). One or more of the criteria may be based on other factors such as device and/or user status corresponding to one or more permissions. Other examples, however, may be implemented.

Items and/or techniques described herein may provide one or more of the following capabilities, as well as other capabilities not mentioned. Rapid, local communication between devices may be facilitated. Localized requests, offers, notifications, and/or other communications may be facilitated. Acquisition of requested resources at a desired location may be coordinated among multiple devices through sidelink communication, e.g., to obtain assistance at the location from a human associated with a wireless communication device and to obtain delivery of an apparatus to the location by another person associated with another wireless communication device. Wireless communication between devices may be performed in the absence of a network connection. Peer-to-peer communication may be performed in parallel with network communication. Reach of communications may be extended by a mesh network of communications. Other capabilities may be provided and not every implementation according to the disclosure must provide any, let alone all, of the capabilities discussed.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both.

Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a van, a truck, etc.), a drone, a roadside unit (RSU), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110a, 110b, 114 may be configured to communicate with the UE 105 via multiple carriers. Each of the BSs 110a, 110b, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples only as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110a, 110b, 114, the core network 140, and/or the external client 130. For example, such other devices may include internet of thing (IoT)

devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V21 (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH). For example, the UEs 105, 106 may communicate over a sidelink communication link 107 with LTE sidelink communication and/or 5G NR sidelink communication (e.g., 5G C-V2X (cellular vehicle-to-everything) communication such that one or both of the UEs 105, 106 may be a vehicle, such as a car).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs.

Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110a, 110b, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the core network 140, and provides QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
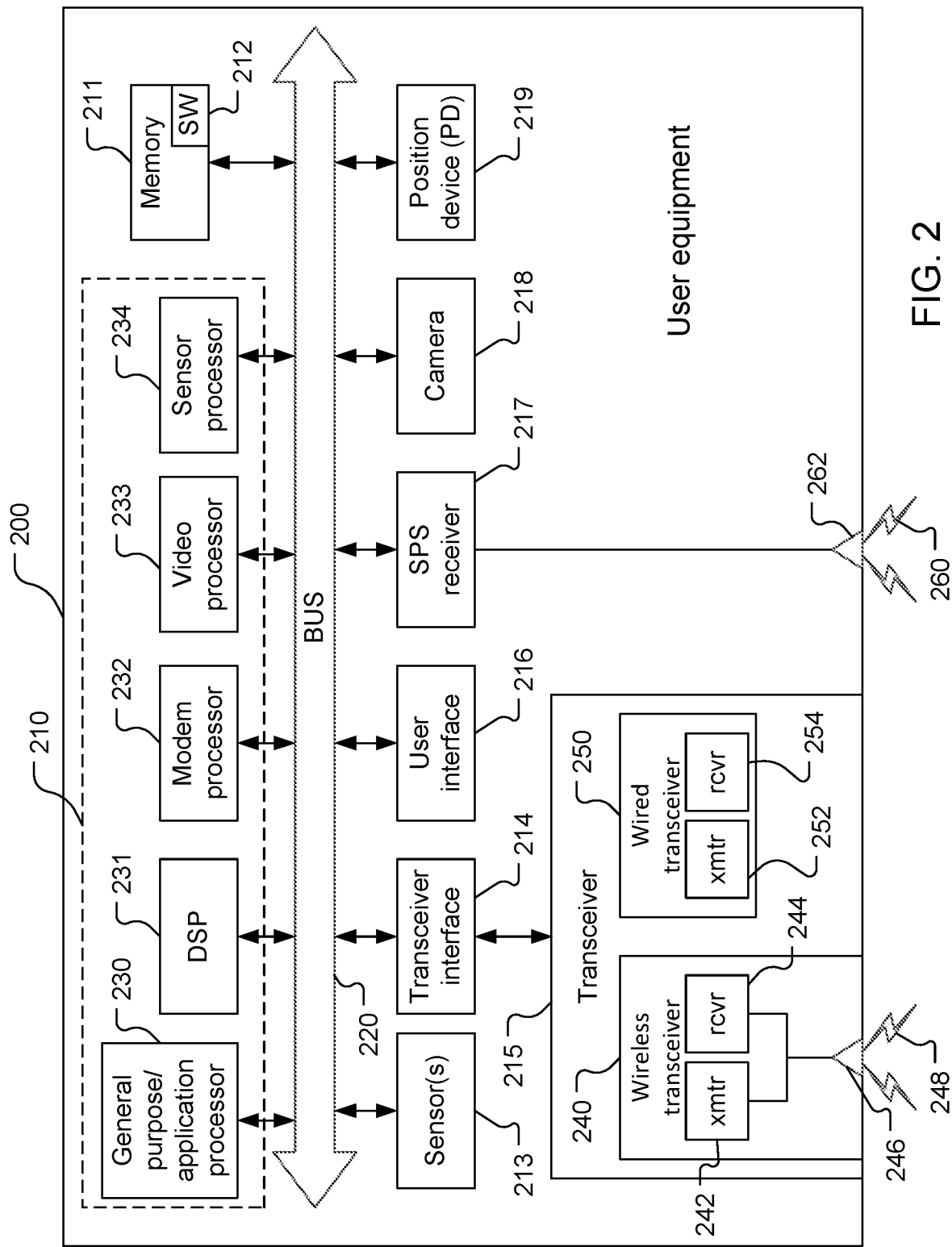
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more cellular wireless signals transmitted and reflection(s) used to identity, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., with the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 262, and/or another component of the UE 200, and may be provided by hardware, software, firmware, or various combinations thereof.

Figure 3:
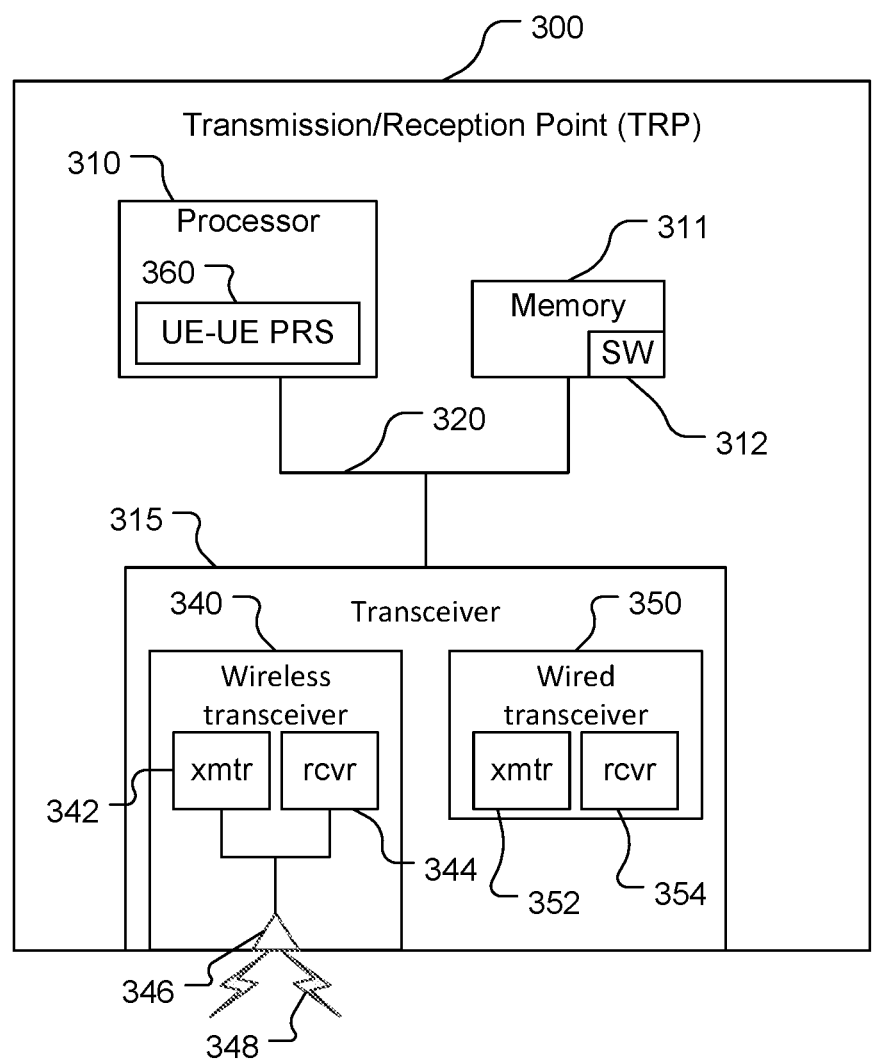
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 410 and the memory 411) of the TRP 300 (and thus of one of the BSs 110*a*, 110*b*, 114) performing the function. The processor 310 may include a memory with stored instructions in addition to and/or instead of the memory 311. Functionality of the processor 310 is discussed more fully below. The processor 310 (possibly in conjunction with the memory 311 and, as appropriate, the transceiver 315) includes UE-UE PRS unit 360. The UE-UE PRS unit 360 may be configured to coordinate (e.g., schedule) exchange of UE-UE PRS, i.e., sidelink PRS, for establishing a UE as an anchor point for use in determining a position of another UE. The configuration and functionality of the UE-UE PRS unit 360 is discussed further herein.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the network 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
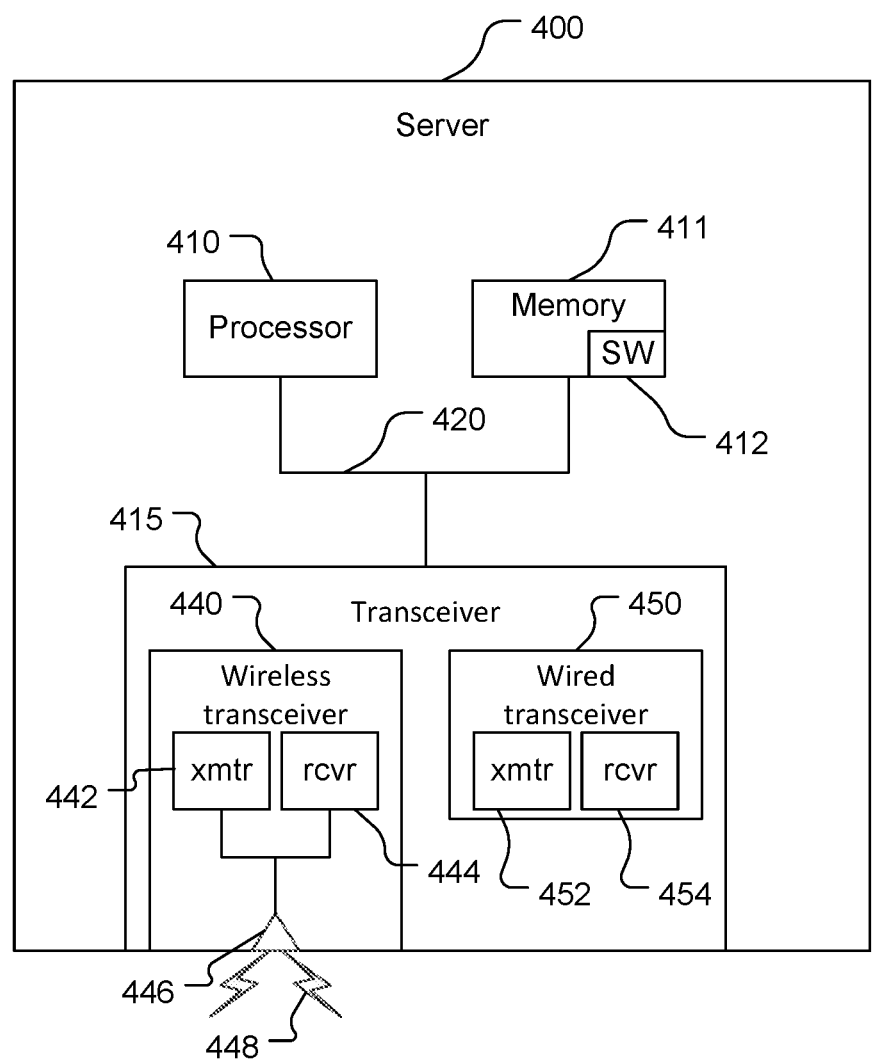
FIG. 4 is a block diagram of components of an example server shown in FIG. 1.

Referring also to FIG. 4, a server 400, which is an example of the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels)

and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the network 135 to send communications to, and receive communications from, the TRP 300, for example, and/or one or more other entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

Positioning Techniques

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

Sidelink-Based Communication

Figure 5:
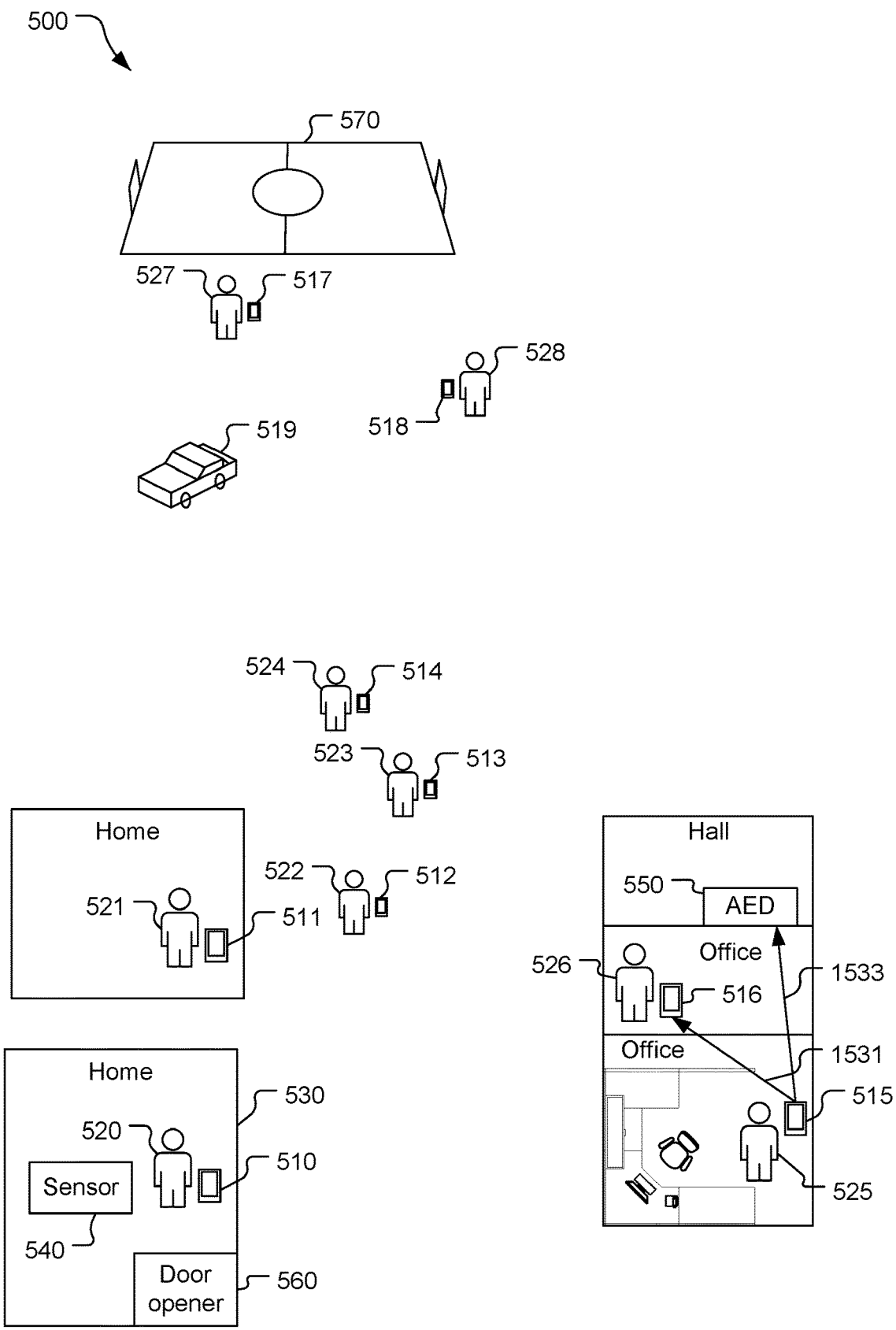
FIG. 5 is a simplified view of a user equipment environment.

Referring to FIG. 5, with further reference to FIGS. 1-4, a user equipment environment 500 includes numerous UEs, many with associated users and some without associated users (e.g., fixed-location devices capable of sending and receiving wireless signals). The UEs are each configured to send and receive sidelink signals, referred to herein as sidelink communications regardless of a format of the signals. Using sidelink communications facilitates communication between nearby UEs, e.g., UEs within about 1 km of each other. Using sidelink communication may be more rapid that communication through one or more network entities such as base stations or access points. Thus, for example a UE 510 in a home 530 may be used to send a sidelink communication to nearby UEs, e.g., UEs of neighbors of a user 520 of the UE 510 such as a UE 511 of a neighbor 521 and UEs 512, 513, 514 of other nearby users 522, 523, 524. Similarly, a UE 515 of a person 525 may be used to send and/or receive sidelink communications to and/or from a UE 516 of a co-worker 526 of the person 525, and a UE 517 of a user 527 (a spectator in this example) may be used for sidelink communication with a UE 518 of a nearby person 528 and/or one or more other UEs such as a vehicle UE 519. UEs may or may not be associated with a user. For example, a sensor 540 may be a UE that is unaffiliated with a user, at least some of the time. The sensor 540 may be, for example, a smoke detector, a carbon monoxide detector, a water sensor, etc. Devices such as an AED 550 (automated external defibrillator) or a door opener 560 are other examples of UEs that may be unaffiliated with a user.

Sidelink communication between UEs provides quick communication between proximate UEs and has countless applications. For example, time-sensitive needs may be met using sidelink communication, such as the need for a person skilled at providing CPR (cardiopulmonary resuscitation) and the need to obtain and deliver and AED to a person in cardiac arrest. AED locations may be unknown and/or an AED may be far enough away from a person in cardiac arrest that a person near the AED needs to bring the AED to the person in cardiac arrest. Thus, for example, the person 525 could send a sidelink communication to the co-worker 526 and to the AED 550 that an AED and/or a person skilled in CPR is needed and where. The AED 550 may provide the location of the AED 550 to the co-worker 526 in a sidelink communication. The co-worker 526 may retrieve and deliver the AED 550 to the person 525. Another person that is skilled in CPR may respond to the communication indicating the need for CPR by going to the indicated location. As another example application of SL communication, the user 522 may send an SL communication offering a product and/or a service (e.g., a child offering lemonade for sale, or a person offering a free item to the person's neighbors, or a person offering services for sale such as lawn care, babysitting, etc.). An SL communication could be used to request a product and/or a service (e.g., requesting first aid at a soccer field 570 due to an injury, requesting a jump for a car with a dead battery, requesting persons to look for a lost pet, etc.).

As another example, the sensor 540 could detect a situation (e.g., presence of smoke, water, water leak, etc.) and send an alert indicating the issue. The alert may be sent to neighbors (e.g., in a multicast SL communication) requesting assistance in correcting the issue, e.g., if an occupant of the home 530 is not at the home 530. As another example, an abduction alert may be sent by a UE, e.g., a UE of a person being abducted, requesting persons to stop the abduction. An SL communication may include an implicit or explicit instruction. For example, an alert communication sent by the sensor 540 may include an instruction to the door opener 560 to open a door (e.g., a garage door). As another example, an SL communication concerning an abduction may explicitly or implicitly instruct a nearby UE (e.g., a UE within a threshold distance of the UE sending the SL communication, and/or a UE closest to the UE sending the SL communication) to send an alert. For example, a UE of an abductor may be caused to send an alert periodically, unbeknownst to the abductor, with relevant information such as a location of the UE, a description of the abductor, speed and direction of the UE of the abductor, etc. As another example, the UE of the abductor may be instructed to record audio and/or one or more images (still or video), e.g., for use by law enforcement.

Figure 6:
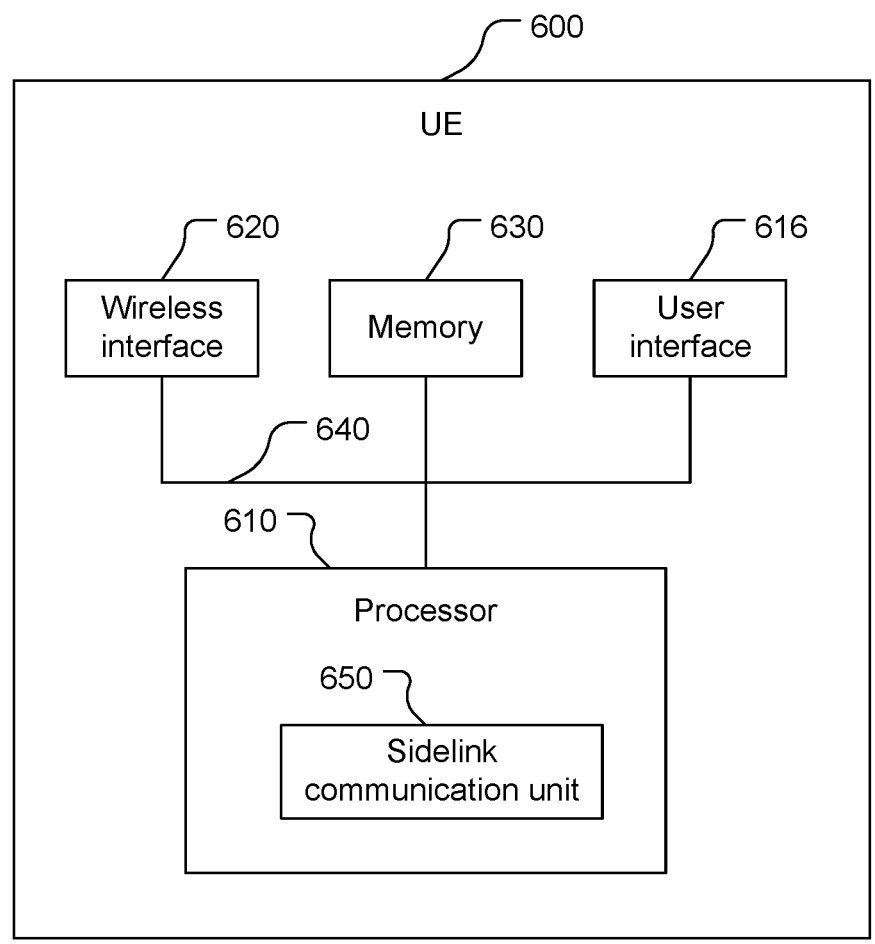
FIG. 6 is a block diagram of a user equipment.

Referring to FIG. 6, with further reference to FIGS. 1-5, a UE 600 includes a processor 610, a user interface 616, a wireless interface 620, and a memory 630 communicatively coupled to each other by a bus 640. The UE 600 may include some or all of the components shown in FIG. 6, and may include one or more other components such as any of those shown in FIG. 2 such that the UE 200 may be an example of the UE 600. One or more of the components shown in FIG. 6 may be omitted from the UE 600. For example, embodiments of the UE 600 may not include the user interface 616. The user interface 616 may be configured in a variety of manners, e.g., including a graphical user interface (GUI) with a display and/or another visual indicator (e.g., a light), and/or a speaker, and/or one or more tactile output indicators (e.g., a vibration mechanism configured to cause the UE to vibrate), etc. The processor 610 may include one or more components of the processor 210. The wireless interface 620 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. The UE 600 may also include a wired interface such as the wired transmitter 252 and/or the wired receiver 254. The wireless interface 620 may include the SPS receiver 217 and the antenna 262. The memory 630 may be configured similarly to the memory 211, e.g., including software with processor-readable instructions configured to cause the processor 610 to perform functions.

The description herein may refer only to the processor 610 performing a function, but this includes other implementations such as where the processor 610 executes software (stored in the memory 630) and/or firmware. The description herein may refer to the UE 600 performing a function as shorthand for one or more appropriate components (e.g., the processor 610 and the memory 630) of the UE 600 performing the function. The processor 610 (possibly in conjunction with the memory 630 and, as appropriate, the wireless interface 620) includes a sidelink communication unit 650. The sidelink communication unit 650 may be configured to produce and send sidelink communications via the wireless interface. Also or alternatively, the sidelink communication unit 650 may be configured to receive a sidelink communication via the wireless interface 620 and determine whether to take an action in response to the communication, e.g., based on one or more criteria for acting on the SL communication and one or more characteristics corresponding to the SL communication. The configuration and functionality of the sidelink communication unit 650 is discussed further herein.

Referring also to FIGS. 7A-7F, the SL communication unit 650 may be configured to instruct the user interface 616 to prompt the user to provide input to produce an SL communication to be sent via the wireless interface 620. For example, the SL communication unit 650 may instruct, e.g., in response to a request by a user of the UE 600 to send an SL communication (e.g., in response to selection of an SL communication icon by the user), the user interface 616 to prompt the user for a communication type, communication content, and/or one or more communication destinations.

In this example, a display 700 of the user interface 616 shows icons to prompt the user to provide the input, e.g., by selecting one or more of the icons. Here, the display 700 shows a medical emergency icon 711, a family emergency icon 712, a product offer icon 713, a product request icon 714, a service offer icon 715, and a service request icon 716. These are examples of possible types of communications that a user may desire to send. The icons 711-716 are not required, and one or more of the icons 711-716 may not be provided, and/or one or more other icons corresponding to one or more other types of communications may be used. The SL communication unit 650 may be configured to have the display 700 provide an other/custom icon 717 to allow the user to provide a custom communication type, e.g., by typing in a name of the communication type.

Figure 7A:
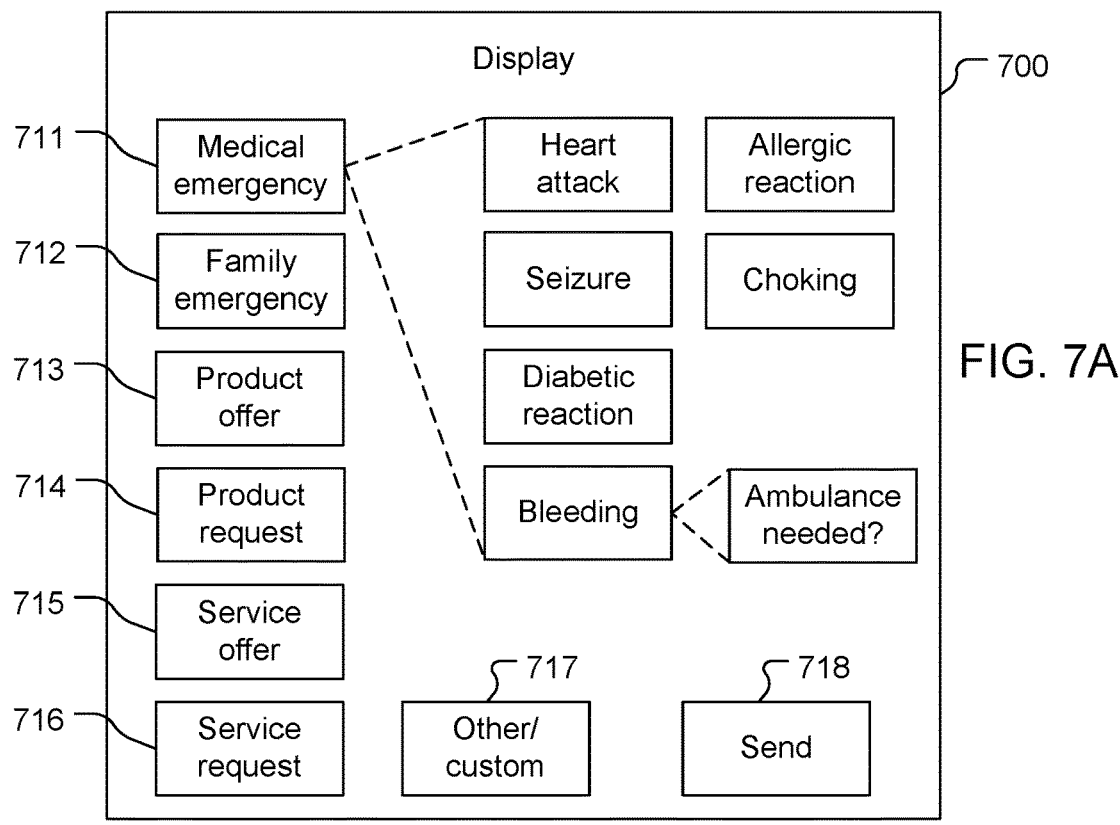
FIG. 7A is a user interface screenshot with SL communication type prompts, with sub-prompts for a medical emergency.
Figure 7B:
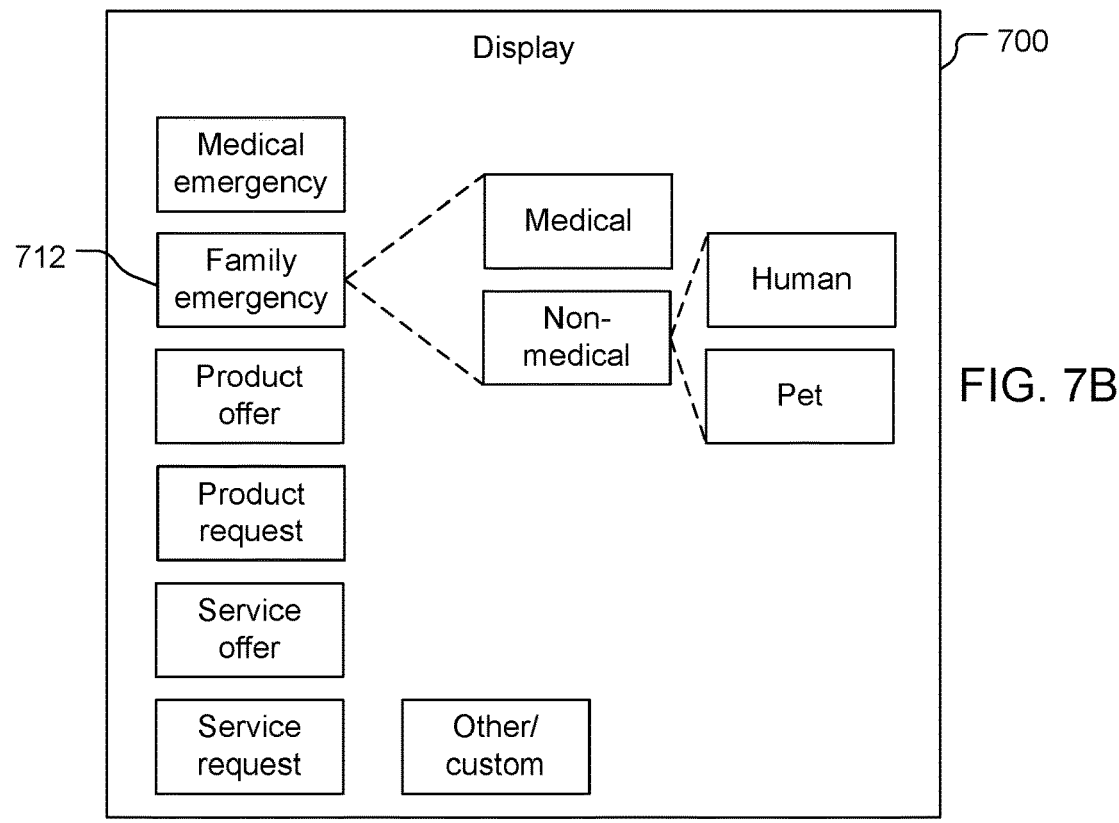
FIG. 7B is a user interface screenshot with SL communication type prompts, with sub-prompts for a family emergency.
Figure 7C:
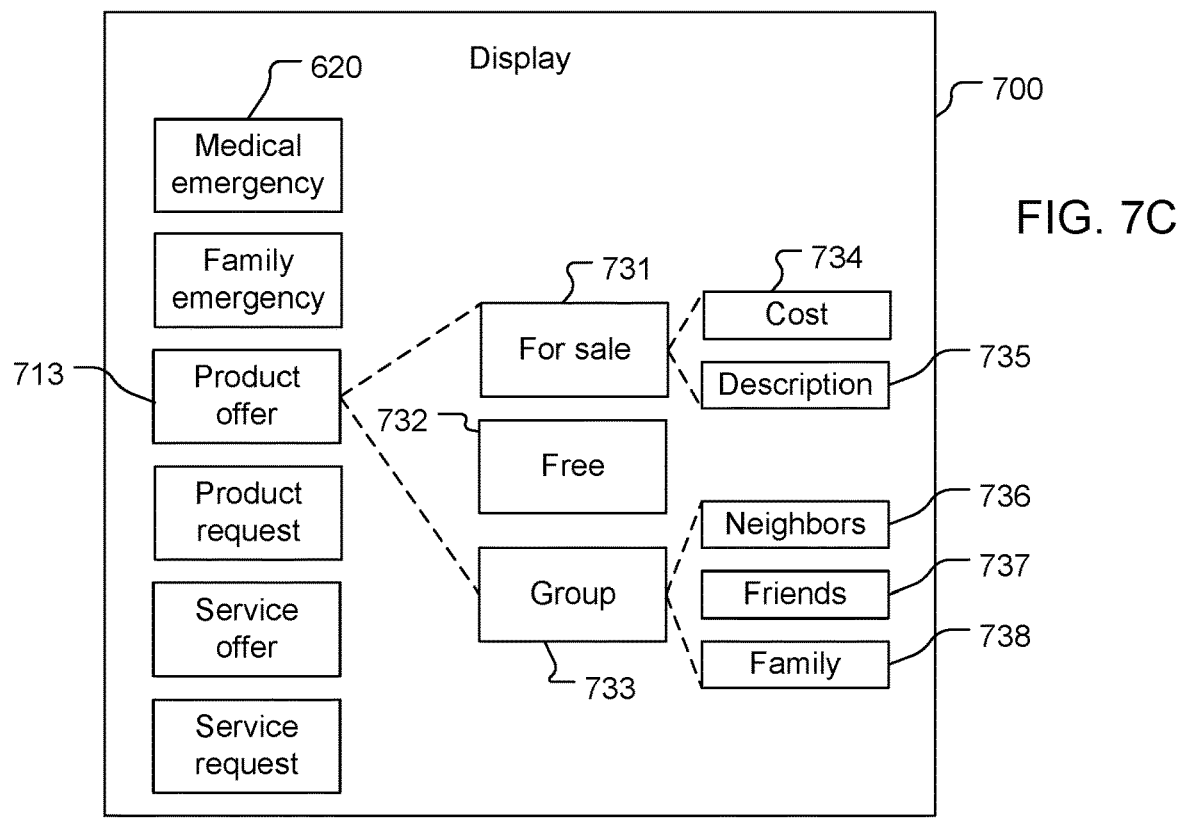
FIG. 7C is a user interface screenshot with SL communication type prompts, with sub-prompts for a product offer.
Figure 7D:
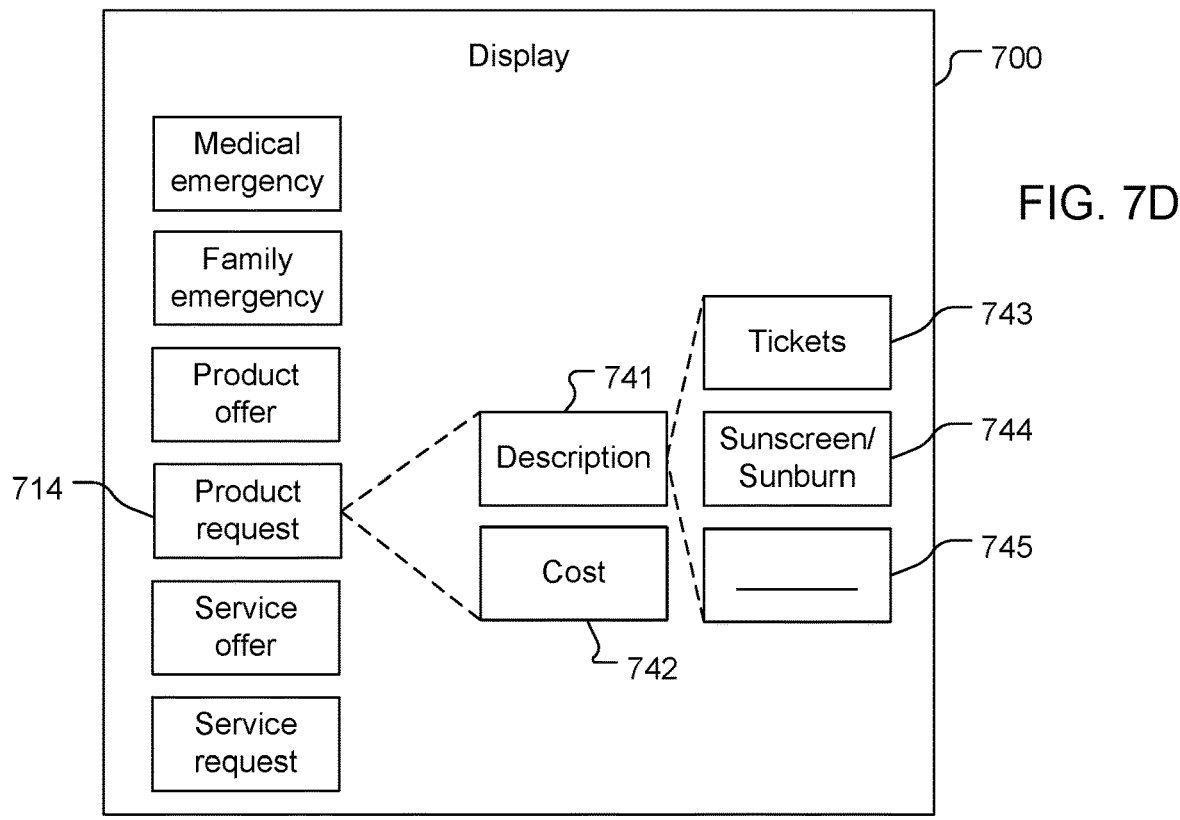
FIG. 7D is a user interface screenshot with SL communication type prompts, with sub-prompts for a product request.
Figure 7E:
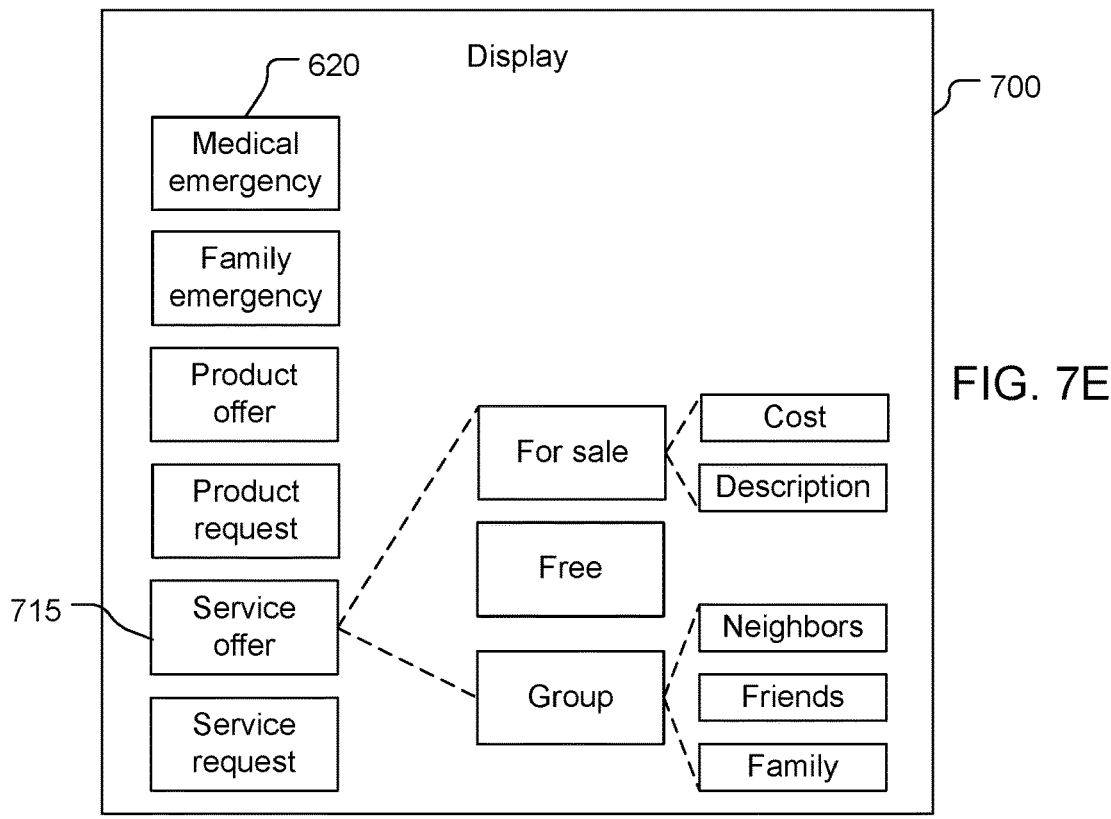
FIG. 7E is a user interface screenshot with SL communication type prompts, with sub-prompts for a service offer.
Figure 7F:
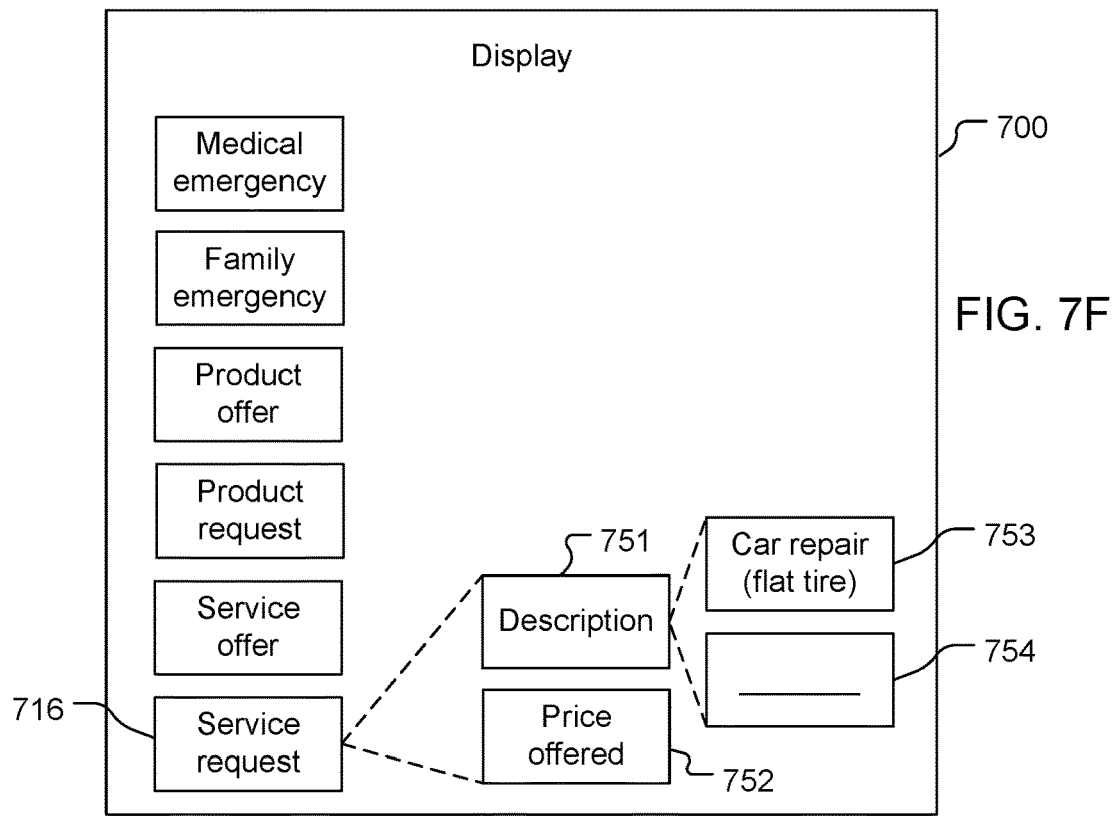
FIG. 7F is a user interface screenshot with SL communication type prompts, with sub-prompts for a service request.

The SL communication unit 650 may be configured to respond to selection of an icon by having the display show one or more further icons. The one or more further icons may, for example, indicate communication sub-types corresponding to the communication type of a selected icon or comprise prompts for information such as communication content and/or destination(s) of the SL communication to be sent. As shown in the example of FIG. 7A, in response to selection of the medical emergency icon 711, the SL communication unit 650 causes the display 700 to show a heart attack icon, an allergic reaction icon, a seizure icon, a choking icon, a diabetic reaction icon, and a bleeding icon. Selection of the bleeding icon, in this example, causes the SL communication unit 650 to cause the display 700 to provide an ambulance needed icon inquiring whether an ambulance should be requested. The processor 610 may be configured to respond to selection of the ambulance needed icon by sending a cellular communication (e.g., an e911 call in the United States) to a network entity such as a server to request that an ambulance be sent to the location of the UE 600. As shown in the example of FIG. 7B, in response to selection of the family emergency icon 712, the SL communication unit 650 causes the display 700 to show a medical icon and a non-medical icon either of which the user may select to further define the communication type of the SL communication to be sent. As shown in the example of FIG. 7C, in response to selection of the product offer icon 713, the SL communication unit 650 causes the display 700 to show a for sale icon 731, a free icon 732, and a group icon 733. The SL communication unit 650 may be configured to instruct the display 700 to prompt the user for further information, e.g., communication content. For example, the SL communication unit 650 may respond to selection of the for sale icon 731 by having the display 700 show a cost icon 734 and a description icon 735 to prompt the user for a cost and/or a description of the item for sale, which may be entered (e.g., using a virtual keyboard) in response to selection of the cost icon 734 and/or the description icon 735. As another example, the SL communication unit 650 may respond to selection of the group icon 733 by having the display prompt the user for one or more destinations of the SL communication to be produced. In this example, the SL communication unit 650 is configured to respond to selection of the group icon 733 by having the display 700 show a neighbors icon 736, a friends icon 737, and a family icon 738. The destination(s) associated with each of these categories of destinations may be customized by the user, e.g., prior to indication by the user of the desire to send an SL communication, as discussed further herein. As shown in the example of FIG. 7D, in response to selection of the product offer icon 713, the SL communication unit 650 causes the display 700 to show a description icon 741 and a cost icon 742. In response to selection of the description icon 741, the SL communication unit 650 causes the display to show a tickets icon 743, a sunscreen/sunburn icon 744, and a custom entry icon 745. The custom entry icon 745 in this example is a blank line indicating to the user that the user may enter a custom description by selecting the custom entry icon 745 and, e.g., typing in the custom entry using a virtual keyboard displayed in response to selection of the custom entry icon 745. As shown in the example of FIG. 7E, in response to selection of the service offer icon 715, the SL communication unit 650 causes the display 700 to show the same icons as provided in response to selection of the product offer icon 713. This, however, is an example only, and different icons may be provided in response to selection of the product offer icon 713 and the service offer icon 715. As shown in the example of FIG. 7F, in response to selection of the service request icon 716, the SL communication unit 650 causes the display 700 to show a description icon 751 and a price offered icon 752. In response to selection of the description icon 751, the SL communication unit 650 causes, in this example, the display 700 to show a car repair icon 753 and a custom entry icon 754.

The SL communication unit 650 may be configured to send an SL communication via the wireless interface 620 in response to information for the communication being completed, or in response to selection of a send icon 718 (see FIG. 7A). In response to selection of the send icon 718, the SL communication unit 650 may send the communication via the wireless interface 620 if the communication is sufficiently complete, or otherwise may cause the user interface 616 to prompt the user to complete information for the communication. Different types of communications may have different amounts of information to be complete. For example, an indication of an abduction may be complete upon selection of an appropriate icon (e.g., an "Amber alert" icon), and possibly confirmation of the selection, while a product offering may have a product description and a price (which may be free) in order to be complete.

The one or more icons provided in response to selection of another icon may vary based on one or more parameters. Thus, selection of the same icon multiple times may result in different icons be provided in response to the selections based on the parameter(s), e.g., time of day, location of the UE 600, motion (or lack thereof) of the UE 600, icon selection history, status of the user associated with the UE 600 (e.g., an activity engaged in by the user according to a calendar entry stored in the memory 630), etc. For example, the SL communication unit 650 may cause the tickets icon 743 and the sunscreen/sunburn icon 744 to be displayed in response to selection of the description icon 741 based on the UE 600 being located within a threshold distance, e.g., 50 m, of an outdoor arena (e.g., sports arena, outdoor amphitheater) and a time of day being during daylight hours. As another example, the SL communication unit 650 may cause the car repair (flat tire) icon 753 to be displayed in response to selection of the description icon 751 based on the UE 600 being located along a side of a road and being stationary.

The SL communication unit 650 may be configured to instruct the user interface 616 to prompt the user to provide input to produce an SL communication to be sent via the wireless interface 620. For example, the SL communication unit 650 may instruct, e.g., in response to a request by a user of the UE 600 to send an SL communication (e.g., in response to selection of an SL communication icon by the user), the user interface 616 to prompt the user for a communication type, communication content, and/or one or more communication destinations.

Referring also to FIG. 8, the memory 630 may store one or more action criteria values for determining whether to take one or more actions in response to receiving an SL communication and if so, what action(s) to take. As shown, a criteria set 800 includes multiple action criteria values 810, 820 of action criteria for assessing an incoming SL communication and action slots 830 indicative of whether to take one or more actions and the action(s) to take for various criteria values including combinations of criteria values. In this example, action criteria include communication type (with values here of "medical emergency," "family emergency," "product offer," "product request," "service offer," and "service request"), communication source (with a value here of "spouse"), status of a user associated with the UE 600 (with values here of "busy," "in meeting," "on vacation," "invisible," "driving"), and status of the UE 600 (e.g., location of the UE 600 (with values here of "at work," "at home"), phone function of the UE 600 in use). In the example shown, example actions are included for some combinations of criteria values. For example, for an incoming SL communication type of "medical emergency" and user status of "on phone," and the SL communication unit 650 is configured to send an acknowledgement (ACK) to the sending UE and to provide an estimated time of arrival (ETA) of the user of the UE 600 to the location of the source of the SL communication (or other location indicated in the SL communication). As another example, for an incoming communication type of "product offer" or "product request" with the location of the UE 600 being "at home," the SL communication unit 650 is configured to have the user interface 616 display an indication of the product offer or product request. As another example, for a source of the incoming SL communication being "spouse" and user status being "busy," the SL communication unit 650 is configured to send a reply indicating that the user is busy. One or more actions may be provided for a single criterion value, e.g., for any incoming communication from a particular source, the same action may be performed (e.g., an indication of the communication displayed by the user interface 616). The configuration of the SL communication unit 650 as to whether and how to respond to an incoming SL communication may be static (e.g., coded during manufacture of the UE 600) or dynamic (e.g., by input from the user interface 616 being stored in the memory 630 for use by the SL communication unit 650, as discussed further below).

The criteria set 800 is an example only, and more, fewer, and/or other action criteria and/or action criteria values may be used. In the criteria set 800, blank boxes indicate no action to be taken based on a corresponding combination of criteria values for an incoming SL communication, and "X"

may indicate that some action is to be taken but that action is not specified in the figure (e.g., for sake of simplicity of the figure or because an action to be taken depends on one or more further criteria values). For example, referring also to FIG. 9, a criteria set 900 corresponds to the family emergency and medical emergency portions of the criteria set 800, with the criteria set 900 including further criteria values (sub-criteria values) to determine whether and what action(s) to take based on an incoming SL communication. In this example, different decisions regarding whether to take an action may be based on whether a family emergency is a medical emergency, a non-medical emergency involving a human family member, or a non-medical emergency involving a family pet. Also in this example, different decisions regarding whether to take an action may be based on whether a medical emergency warrants someone with CPR training to respond or whether the medical emergency concerns an allergic reaction. Still further details and/or combinations of criteria values may be possible (e.g., different types of meetings, activities at home or another location, whether the user is on the phone while at work or on the phone while at home, etc.).

The action criteria values may have different priorities such that if criteria values are met for multiple action slots 830, then one of the action slots 830 may be selected over another. For example, "in a meeting" may be higher priority than at work such that if a user is both at work and in a meeting and an incoming SL communication is received from the spouse of the user, then the action slot 830 for in a meeting and spouse as the source is selected such that, in this example, the incoming communication will be ignored (e.g., not indicated to the user via the user interface 616). Default priorities may be provided and/or priorities may be established by a user, e.g., overriding default priorities and/or establishing priorities where no default priorities existed. Priorities, especially default priorities, may correspond to different levels of trust in an incoming communication, e.g., based on a source of the communication, a communication type, etc.

Figure 10:
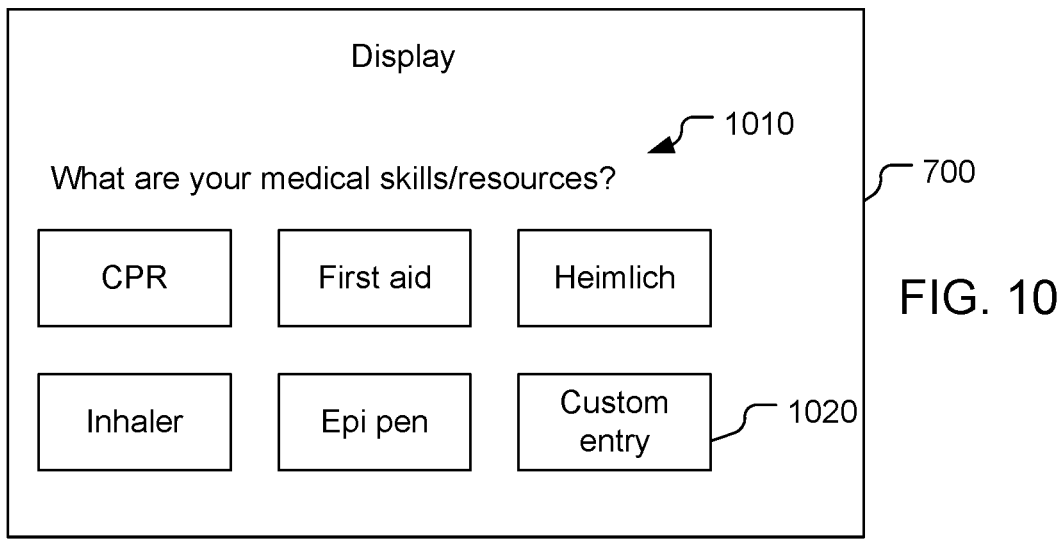
FIG. 10 is a user interface screenshot with prompts for medical skills/resources.
Figure 11:
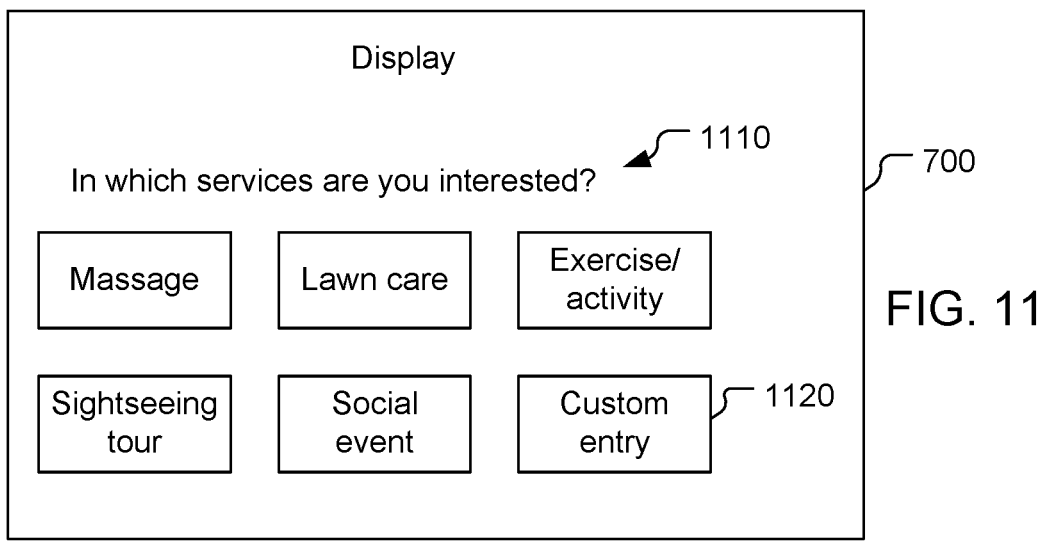
FIG. 11 is a user interface screenshot with prompts for user interests.

The criteria values for assessing incoming SL communications may include one or more default criteria values and/or one or more selected criteria values. A selected criterion value may be selected from presented choices or input by a user of the UE 600. The SL communication unit 650 may cause the user interface 616 to prompt a user for input (e.g., provide visual prompts on the display 700 and/or provide audible prompts through a speaker of the user interface 616) regarding action criteria values, e.g., in response to selection by the user to establish an account for an SL communication app, or selection of settings for such an app, etc. The input regarding the action criteria values may include what the action criteria values are and what action to take corresponding to each action criteria value or action criteria value combination. For example, referring to FIG. 10, the SL communication unit 650 may cause the display 700 of the user interface to provide a query 1010 as to the medical skills and/or resources possessed by the user that the user is willing to share. In conjunction with the query 1010, the SL communication unit 650 may have the display 700 provide choice icons for common skills and/or resources and/or may have the display 700 provide a custom entry icon 1020 to allow for custom input by the user in response to selection of the custom entry icon, and/or may have the display prompt for custom input without the user having to select an icon. As another example, referring to FIG. 11, the SL communication unit 650 may cause the display 700 of the user interface to provide a query 1110 as to which services the user has an interest (e.g., desires being notified of an SL communication offering such service(s)). As with the query 1010, in conjunction with the query 1110, the SL communication unit 650 may have the display 700 provide choice icons for common interests and/or may have the display 700 provide a custom entry icon 1120 to allow for custom input by the user in response to selection of the custom entry icon, and/or may have the display prompt for custom input without the user having to select an icon. The SL communication unit 650 may be configured to respond to selection of one or more skills/resources choices and/or one or more interests and/or input of one or more custom skills/resources and/or interests by automatically populating a criteria set database with an appropriate action for the corresponding criteria value or criteria value combination, e.g., display a notification of CPR help needed for a communication type of medical emergency, CPR for any status of the user and any location of the UE 600.

Figure 12:
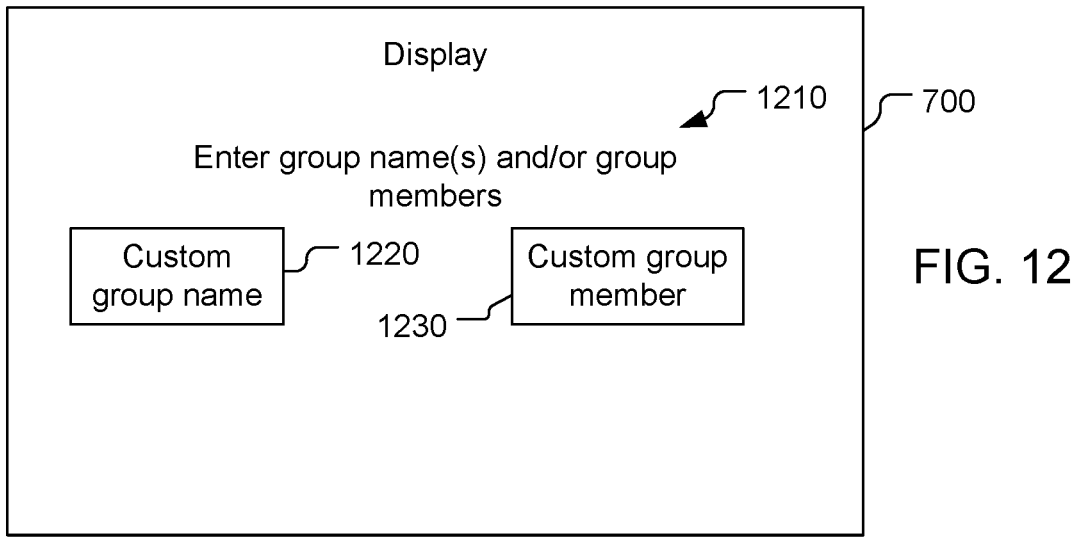
FIG. 12 is a user interface screenshot with prompts for group and group member entry.
Figure 13:
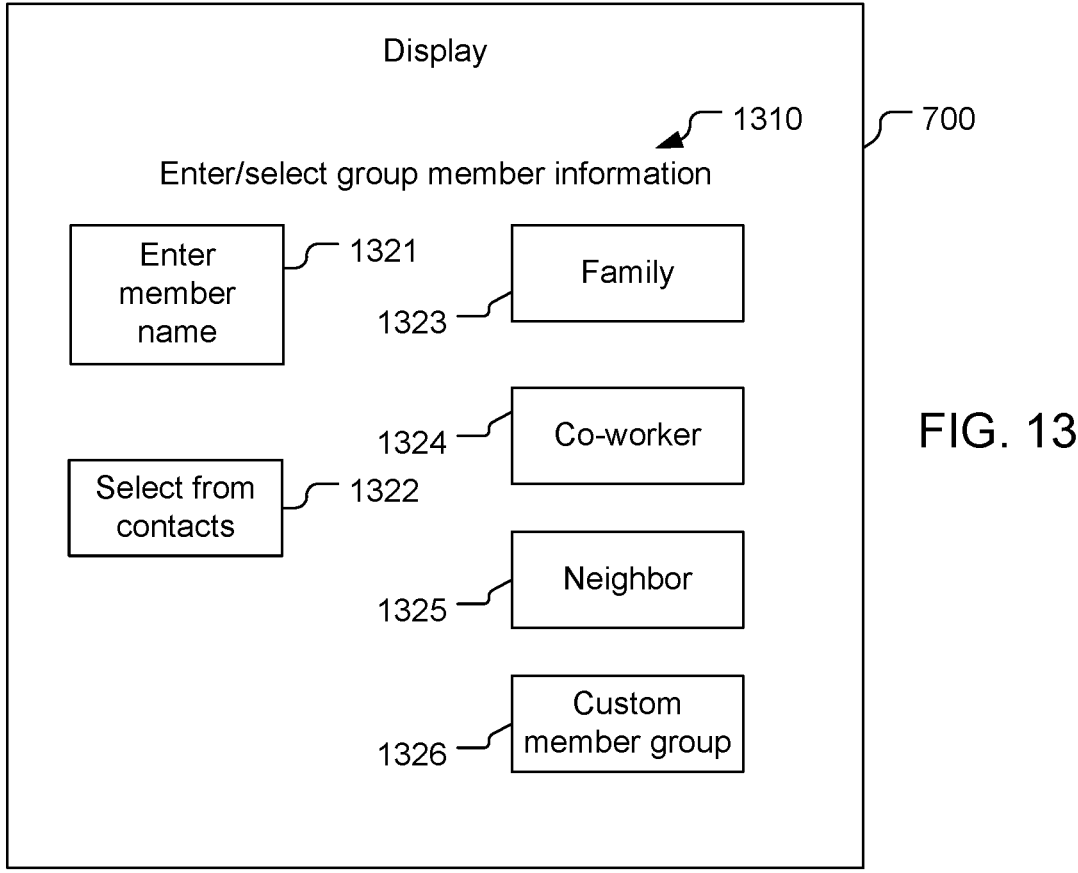
FIG. 13 is a user interface screenshot with prompts for group member information.

The SL communication unit 650 may cause the user interface 616 to prompt a user for input regarding other information for producing an outgoing communication and/or for evaluating an incoming SL communication. For example, referring also to FIG. 12, the SL communication unit 650 may be configured to instruct the display 700 to provide prompts 1210 for a user to input information regarding a group of UEs, e.g., which may be sources and/or destinations of SL communications. As shown, the SL communication unit 650 may cause the display 700 to provide a custom group name icon 1220 and a custom group member icon 1230. The SL communication unit 650 may be configured to respond to selection of one of the icons 1220, 1230 by having the user interface 616 prompt the user to input appropriate information. For example, referring also to FIG. 13, in response to selection of the custom group member icon 1230, the SL communication unit 650 may cause the display 700 to provide a prompt 1310 to enter appropriate information and an enter member name icon 1321, a select from contacts icon 1322, suggested group icons, here a family group icon 1323, a co-worker group icon 1324, and a neighbor group icon 1325, and a custom member group icon 1326. The SL communication unit 650 may be configured to respond to selection of the enter member name icon 1321 by having the display 700 provide a virtual keyboard for the user to use to type in the member name. The SL communication unit 650 may be configured to respond to selection of the select from contacts icon 1322 by having the display 700 provide a list of contacts stored in the memory 630, allowing the user to select one of the contacts as the member. The SL communication unit 650 may be configured to respond to selection of one or more of the icons 1323-1324 by associating the member with the selected group(s) (e.g., family, co-worker, neighbor), e.g., by storing an appropriate indication in association with the member name stored in the memory 630. The SL communication unit 650 may be configured to respond to selection of the custom member group icon 1326 by having the display 700 provide a list of established custom group names, allowing the user to select one or more of the custom group names, and associating the member with the selected group(s). Possible custom groups are infinite, e.g., building security, a lunch bunch (e.g., a group of co-workers that like to eat lunch together), etc.

Figure 14:
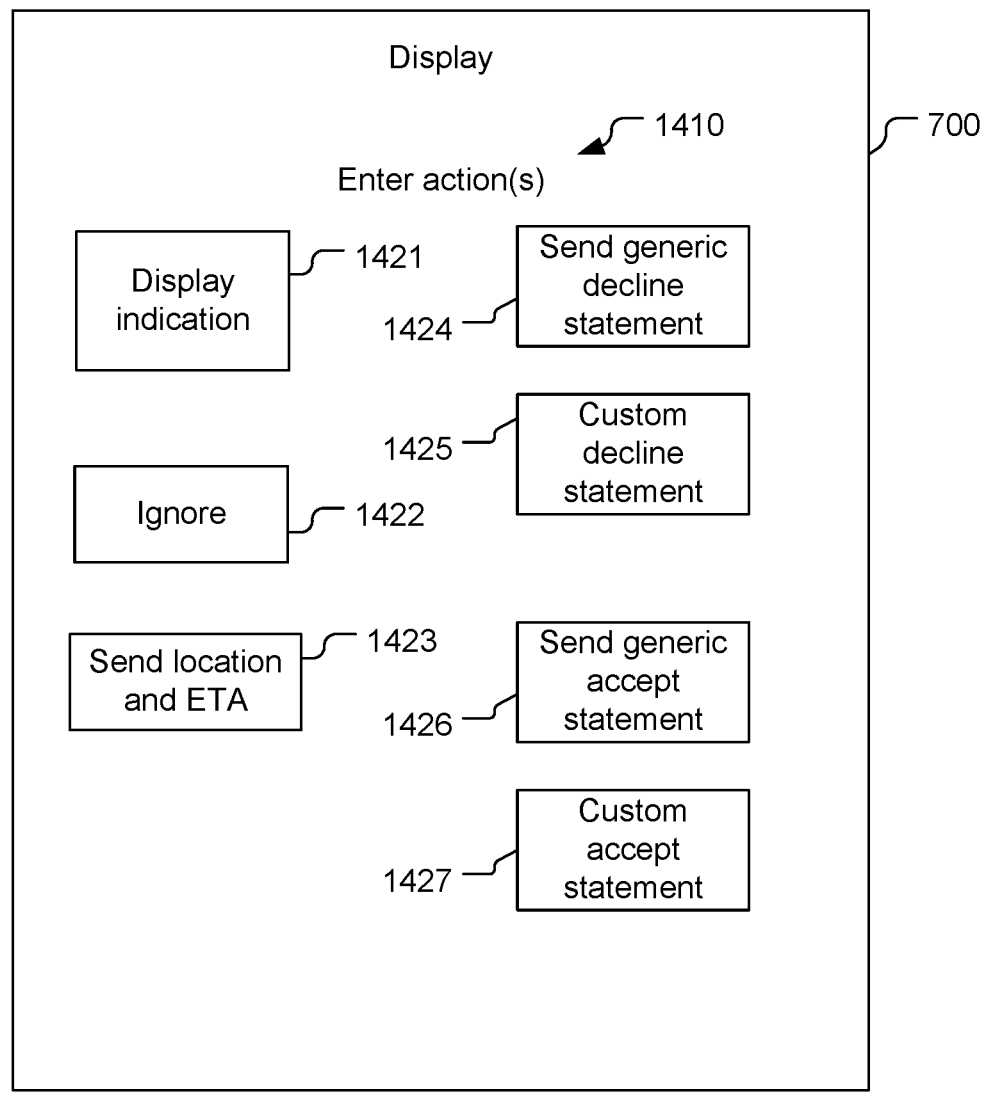
FIG. 14 is a user interface screenshot with prompts for actions.

The SL communication unit 650 may be configured to prompt a user via the user interface 616 to provide one or more actions to be taken in response to receipt of an SL communication meeting one or more of the action criteria values 810, 820. The user may select a criteria value or a combination of criteria values in any of a variety of ways, e.g., by selecting one of the action slots 830 in response to the criteria set 800 being shown on the display 700, or by entering one or more criteria values via one or more prompts such as those shown in FIGS. 7A-7F, etc. Referring also to FIG. 14, the SL communication unit 650 may be configured to have the user interface 616 (here, the display 700) provide a prompt 1410 for the user to enter one or more actions to be taken corresponding to the selected criterion or combination of criteria values. The SL communication unit 650 may be configured to have the display 700 provide icons to assist the user in entering an action. The icons may provide suggested actions and/or allow the user to enter custom actions, e.g., custom content for a reply. In this example, the SL communication unit 650 is configured to have the display 700 provide a display indication icon 1421, an ignore icon 1422, a send location and ETA icon 1423, a send generic decline statement icon 1424, a custom decline statement icon 1425, a send generic accept statement icon 1426, and a custom accept statement icon 1427. Selection of the display indication icon 1421 will set an action of the display 700 showing an indication of a received SL communication. Selection of the icon 1425 or the icon 1427 will result in the user being allowed to enter a statement to be sent in reply to a received SL communication. The icons 1421-1427 shown are examples only, and numerous other possible actions or manners of selecting actions may be used.

Figure 15:
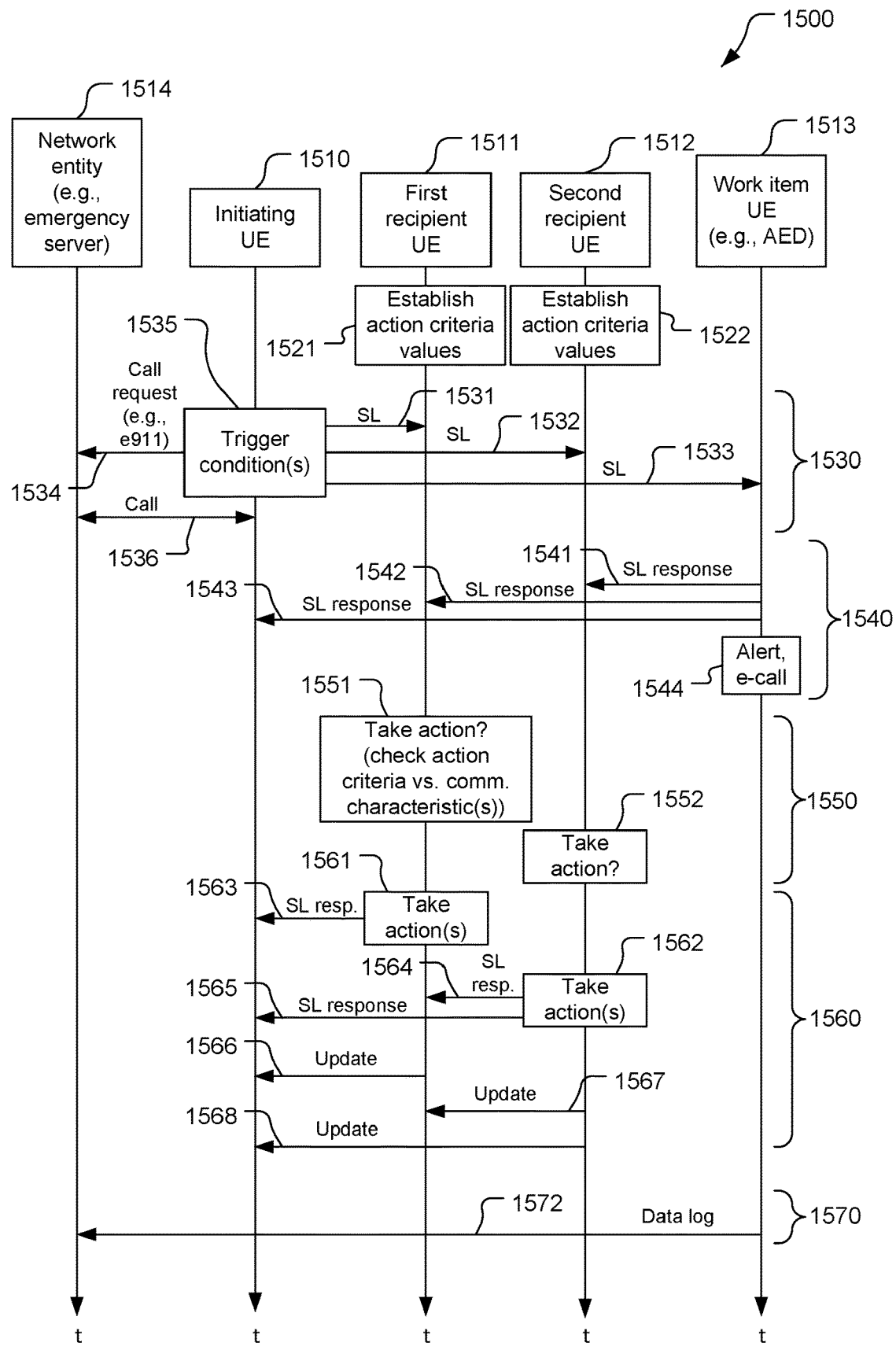
FIG. 15 is a processing and signal flow for exchanging sidelink communications.

Referring also to FIG. 15, a processing and signal flow 1500 for exchanging SL communications includes the stages shown. The flow 1500 is an example, and stages may be added to, removed from, and/or rearranged in the flow 1500. The flow 1500 illustrates example SL communication exchange between an initiating UE 1510, a first recipient UE 1511, a second recipient UE 1512, a work item UE 1513, and a network entity 1514. Other example flows may involve more or fewer entities, e.g., may not involve the second recipient UE 1512, the work item UE 1513, and/or the network entity 1514. The UEs 1510-1512 may each be an example of the UE 600. The work item UE 1513 may be a limited-function UE, e.g., an example of the UE 600 without the SL communication unit 650 or with the SL communication unit 650 configured for limited functionality (e.g., to take action only for a specific communication type such as a request for an AED), but configured to receive SL communications and possibly configured to send SL communications, and possibly without the user interface 616. The work item UE 1513 may, for example, be an IoT (Internet of Things) device. The network entity 1514 may be, for example, a server (e.g., an emergency server for receiving emergency calls) such as an example of the server 400. The flow 1500 provides an example of a request for a person skilled in CPR and for an AED to be delivered to a location, but the disclosure is not limited to this example because countless other purposes for SL communication exchange may be served.

At stages 1521, 1522, the first recipient UE 1511 and the second recipient UE 1512 establish respective action criteria values corresponding to one or more action criteria. For example, default action criteria values may be established during manufacture of the UEs 1511, 1512. As another example, action criteria values may be selected and/or custom entered by respective users of the UEs 1511, 1512, e.g., using the user interface 616 of the respective UEs 1511, 1512, examples of which are discussed above. Stages 1521, 1522 may be performed well in advance of other stages of the flow 1500 and other stages of the flow 1500 may be repeated without repetition of stage 1521 and/or stage 1522.

At stage 1530, one or more communications are sent by the initiating UE 1510 in response to the occurrence of one or more trigger conditions 1535. For example, the SL communication unit 650 of the initiating UE 1510 produces and sends one or more SL communications via the wireless interface 620 to one or more other UEs. The SL communication(s) may be broadcast, multicast, or unicast by the initiating UE 1510. The processor 610 may also send one or more other communications, e.g., a cellular communication to the network entity 1514 (possibly via another network entity such as a TRP 300). The initiating UE 1510 may be configured to send the communication(s) in response to any of a variety of trigger conditions 1535, such as input from a user via the user interface 616, reception of an instruction or a request received via the wireless interface 620, occurrence of an event detected by the processor 610 (e.g., passage of a time interval to separate periodic communication transmission), recently-received communication, etc. In this example, the initiating UE 1510 sends a first SL communication 1531, a second SL communication 1532, and a third SL communication 1533 to the first recipient UE 1511, the second recipient UE 1512, and the work item UE 1513, respectively. The work item UE 1513 is also a recipient UE in that the work item UE 1513 receives an SL communication from the initiating UE 1510. The communications 1531, 1532 may be the same communication (e.g., the same communication type and the same communication content), or different communications, and may be the same or different from the communication 1533. For example, the first SL communication 1531 and the second SL communication 1532 may be a request, an offer, a notification, and/or an instruction, and/or another type of communication, and the third SL communication 1533 may be a request. As another example, the SL communications 1531-1533 may be a single broadcast communication or may be separate broadcast communications. The communications 1531-1532 may include a source ID (e.g., a phone number), a location of the initiating UE 1510, and a communication type (or content from which communication type may be determined). For the example case of a person near the initiating UE 1510 having a heart attack, the communications 1531-1533 may include a location of the initiating UE 1510, may request a person skilled in CPR to come to the location of the initiating UE 1510 and request delivery of an AED to the same location, and may request the AED to send (e.g., broadcast) the location of the AED and the location of the initiating UE 1510. The communications 1531, 1532 may, for example, include a communication type of medical emergency, heart attack (or cardiac arrest). The third SL communication 1533 may include an instruction to provide a visual alert and/or an audible alert (e.g., a flashing light, or an announcement) to attract a person to the work item UE 1513 (e.g., to retrieve the AED and deliver the AED to the location of the initiating UE 1510, e.g., as indicated by the work item UE 1513). With reference to FIG. 5, the UE 515 may be the initiating UE 1510, and may send the first SL communication 1531 to the UE 516 and the third SL communication 1533 to the AED 550. Triggered communications may have different latencies from trigger to sending of the communications, e.g., depending on one or more priorities such as priority of a communication compared to one or more other communications. For example, if a life-threatening emergency communication has been received, e.g., a request for emergency first aid, then sending of a non-life-threatening emergency communication or a non-emergency communication, e.g., a service offer, may be delayed until resolution of the emergency request, e.g., the emergency request is terminated in response to a person providing the requested aid.

The trigger condition(s) 1535 may cause one or more other actions at stage 1530 in addition to sending one or more SL communications. In this example, the initiating UE 1510 responds to the trigger condition(s) 1535 by sending an emergency call request 1534 to the network entity 1514. An emergency call 1536 may be established based on the request 1534 such that the initiating UE 1510 may exchange information with the network entity 1514, e.g., may provide a location of the initiating UE 1510 to the network entity 1514. Also or alternatively, the work item UE 1513 may establish a connection with a network entity, e.g., an emergency call if the work item UE 1513 is, or is associated with, an emergency item/tool. The trigger condition(s) 1535 may include one or more conditions dependent on activity outside of the initiating UE 1510, e.g., a response to an SL communication or lack of response to an SL communication. As another example, the initiating UE 1510 (e.g., the processor 610) may be configured to respond to a threshold amount of time passing after sending an SL communication without an SL response being received by sending one or more communications using a technology other than SL, e.g., one or more WiFi communications and/or one or more Bluetooth® communications.

At stage 1540, the work item UE 1513 takes one or more appropriate actions in response to receiving the third SL communication 1533. The processor 610 of the work item UE 1513 may be configured to analyze the third SL communication 1533 to determine whether to take any action and if so, what action(s) to take. For example, the work item UE 1513 responds to the third SL communication by sending responses 1541, 1542, 1543 to the second recipient UE 1512, the first recipient UE 1511, and the initiating UE 1510. The responses 1541-1543 may be a single broadcast communication or may be unicast or multicast communications. The response 1543 may be a unicast communication. Continuing the example case of a request for an AED, the responses 1541-1543 may include the location of the work item UE 1513 and may include content of the third SL communication 1533 such as the location of the initiating UE 1510. The responses 1541-1543 may include a status of the AED, e.g., fully charged. The work item UE 1513 may be configured to send the responses 1541-1543 only if the AED is operational (e.g., sufficiently charged and in working order) and available (not already in use). At sub-stage 1544, the work item UE 1513 produces one or more alerts. For example, the user interface 616 may include a light that flashes to indicate that the AED is needed. A display of the user interface 616 of the work item UE 1513 may display appropriate information such as the location of the initiating UE 1510 and/or directions to the location of the initiating UE 1510. The work item UE 1513 may produce an audible alert using a speaker of the user interface 616. The audible alert may include an attention-grabbing sound such as a siren, and/or may include words, e.g., indicating need of the AED, location of the need, and/or directions to the location of the need, etc. Also or alternatively at sub-stage 1544, the work item UE 1513 may take other action such as initiating an emergency call (an e-call). Thus, a person providing CPR or other assistance may focus on providing that assistance instead of being distracted by making the emergency call.

At stage 1550, the recipient UEs 1511, 1512 determine whether to take action based on the received SL communications 1531, 1532. For example, at sub-stage 1551, the SL communication unit 650 of the first recipient UE 1511 may find the one or more action criteria values corresponding to (e.g., matching) one or more values of characteristics of the SL communication 1531 (e.g., communication type, communication source (e.g., based on a source ID included in the SL communication), etc.) and/or a present situation (e.g., UE status such as location of the first recipient UE 1511, time of day, movement of the first recipient UE 1511, and/or user status (e.g., determined from calendar entries and/or user input)), etc., and determine to perform any actions corresponding to these action criteria values. For example, as shown in FIG. 8, the first recipient UE 1511 may determine to send an acknowledgement and an ETA to the initiating UE 1510 based on the action criteria values of the communication type being a medical emergency and the UE status being that the first recipient UE 1511 has a phone call in process. As another example, as shown in FIG. 8, a recipient UE may determine to take no action based on a communication type value being a product offer, and a user status being that the user desires to be invisible. At sub-stage 1552, in a similar manner, the second recipient UE 1512 may determine whether to take an action in response to receiving the second SL communication 1532.

At stage 1560, one or more UEs perform the action(s), if any, determined at stage 1550 to be performed. For example, the first recipient UE 1511 may perform one or more actions at sub-stage 1561 and the second recipient UE 1512 may perform one or more actions at sub-stage 1562. Continuing the AED request example, the SL communication unit 650 of the first recipient UE 1511 may cause the user interface 616 to provide one or more indications of the need of a CPR-trained person and/or of an AED based on the action criteria values being associated with this action. The first recipient UE 1511 may also send an SL response 1563 to the initiating UE 1510, e.g., acknowledging receipt of the first SL communication 1531, indicating that a user of the first recipient UE 1511 has CPR skills, and indicating an estimated time of arrival of this user at the location of the initiating UE 1510. The second recipient UE 1512 may send SL responses 1564, 1565 to the first recipient UE 1511 and the initiating UE 1510, respectively. The SL responses 1564, 1565 may be a single broadcast or multicast communication. The SL responses 1564, 1565 may indicate that the AED has been obtained and indicate an ETA for delivery of the AED to the location of the initiating UE 1510. The UEs 1511, 1512 may send SL updates 1566, 1567, 1568, e.g., with updated respective locations of the UEs 1511, 1512 and/or updated respective ETAs of the UEs 1511, 1512 to the location of the initiating UE 1510. The initiating UE 1510 may provide updates as to the location of the initiating UE 1510, e.g., to any UE from which the initiating UE 1510 received a response to an SL communication sent by the initiating UE 1510.

At stage 1570, the work item UE 1513 may provide information to the network entity 1514 (and/or one or more other entities such as one or more of the UEs 1510-1512). For example, in the AED example, the work item UE 1513 may send one or more data log communications 1572 over the air to the network entity 1514 with information pertaining to the use of the AED. The data log communication(s) 1572 may include, for example, activation time, shock delivery times and energy levels, total number of shocks delivered, patient statistics (e.g., ECG (electrocardiogram) data), recorded audio, etc. This may help provide real-time data, e.g., to assist emergency personnel that arrive to provide care to a person that was shocked using the AED.

The flow 1500 is an example, and the case of requesting CPR assistance and an AED using SL communication is an example of the flow. The flow 1500, or variations thereof, may be used for may other purposes, and different examples of the flow 1500 may be used for the same purpose (e.g., different examples for requesting CPR assistance and an AED).

Figure 16:
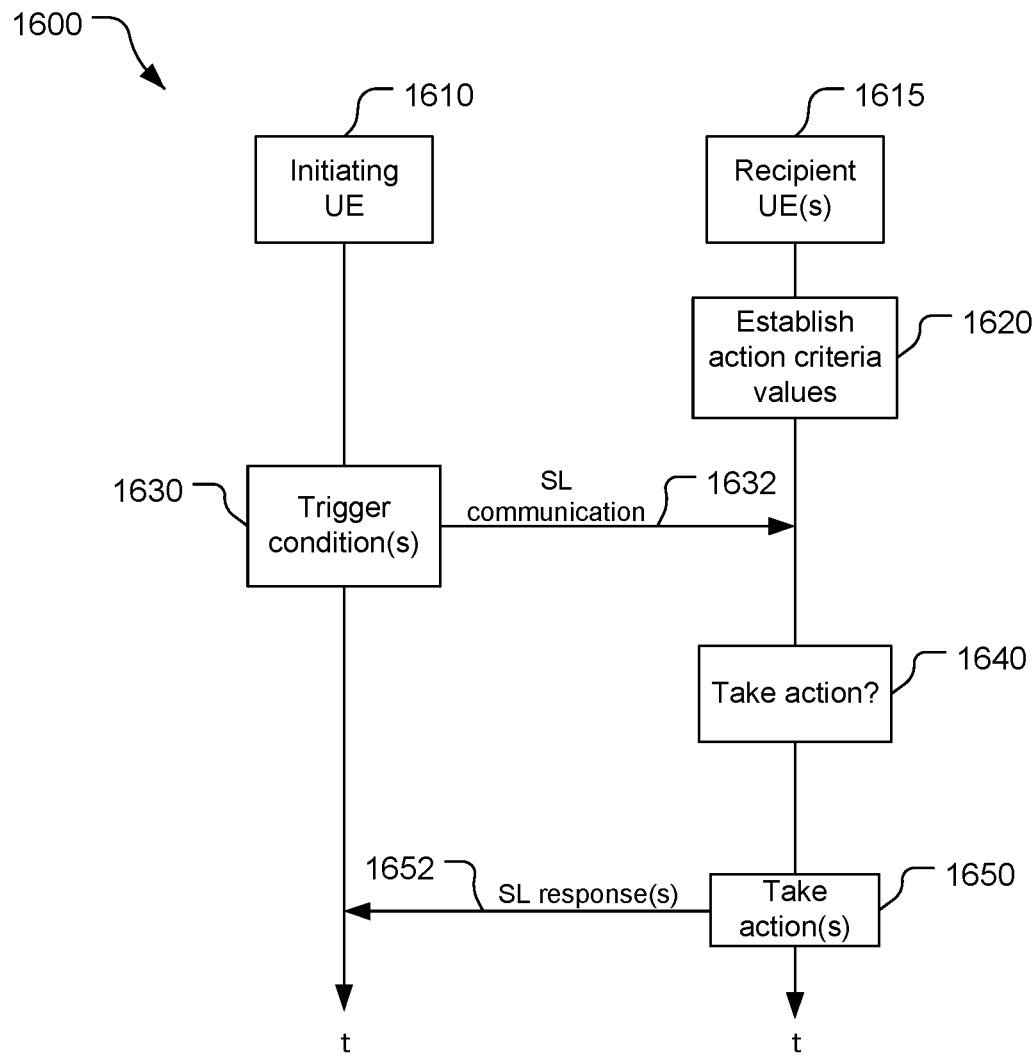
FIG. 16 is another processing and signal flow for exchanging sidelink communications.

Referring also to FIG. 16, a processing and signal flow 1600 for exchanging SL communications includes the stages shown. The flow 1600 is an example, and stages may be added to, removed from, and/or rearranged in the flow 1600. The flow 1500 shown in FIG. 15 may be an example of the flow 1600, with the flow 1600 being of SL signal exchange between an initiating UE 1610 and one or more recipient UEs 1615. The UEs 1610, 1615 may be examples of the UE 600. At stage 1620, the recipient UE(s) 1615 establish action criteria values, e.g., as discussed with respect to stages 1521, 1522, for one or more action criteria. The one or more action criteria may include an SL communication source, a SL communication type, a status of the recipient UE 1615, and/or a status of a user of the recipient UE 1615. At stage 1630, the initiating UE 1610 responds to the occurrence of one or more trigger conditions by sending one or more SL communications 1632 (e.g., one or more broadcast communications) to the recipient UE(s) 1615. At stage 1640, the recipient UE(s) determine whether to take one or more actions in response to receiving the SL communication(s) 1632. For example, the recipient UE(s) may find the action criteria values that correspond to evaluation criteria values that include one or more values of one or more communication characteristics of the SL communication(s) 1632, e.g., a source of the SL communication 1632 and/or a type of the SL communication 1632. The evaluation criteria values may include a status of the recipient UE 1615 and/or a status of a person associated with the recipient UE 1615. The action(s) to be taken may be identified as the action(s) associated with the one or more action criteria that correspond to the one or more evaluation characteristic values (e.g., the action(s) indicated in the action slot 830 corresponding to the action criteria value(s) corresponding to the evaluation characteristic value(s)). At stage 1650, the recipient UE(s) 1615 take(s) the one or more actions determined at stage 1640 to be taken. For example, the recipient UE(s) 1615 may send one or more SL responses 1652, e.g., to the initiating UE 1610 and/or to one or more other entities (e.g., other recipient UE(s) 1615). An SL response 1652 may be a broadcast communication, a multi-cast communication, or a unicast communication. The recipient UE(s) may implement a delay before taking any action such as sending the response 1652, giving notice to a user, etc. For example, this may provide an opportunity for more information to be provided. In an example implementation, a user of the recipient UE 1615 may be willing to respond to a certain type of request, but may want to provide others an opportunity to respond first. For example, a user may have some knowledge of car maintenance, and may be willing to respond to a request for help, but wants to provide an opportunity for someone with more knowledge/experience to respond to a request for help with a car. Whether to delay and/or how much to delay an action may depend on the type of communication received, e.g., a particular type of help requested. For example, a user may program a longer delay for a request for a service that the user is less experienced in providing (e.g., a shorter delay for jump starting a car and a longer delay for diagnosing an engine noise).

Figure 17:
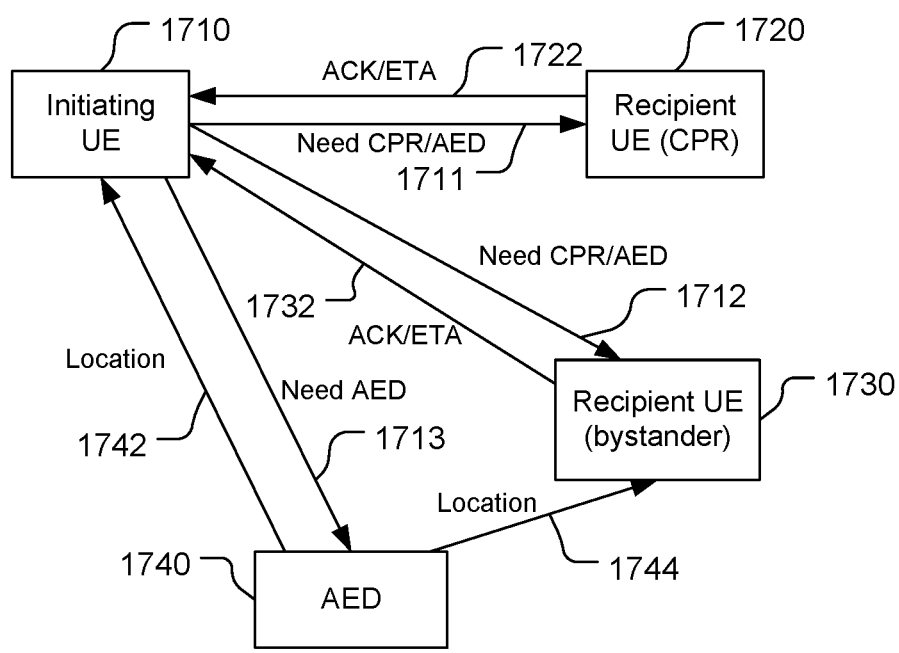
FIG. 17 is a simplified diagram of sidelink signaling for obtaining medical assistance.

Numerous applications of SL communication exchange in accordance with the disclosure (e.g., FIG. 16) are possible. For example, FIG. 17 shows a simplified interaction for the application of requesting a person with CPR training and an AED. An initiating UE 1710 sends SL communications 1711, 1712, 1713 to recipient UEs 1720, 1730, and an AED 1740, respectively. The SL communications 1711-1713 may be the same, e.g., a single broadcast communication, or not (e.g., the communications 1711, 1712 may indicate the location of the initiating UE 1710, the need for a person with CPR training, and the need for an AED, and the communication 1713 may only indicate the need for the AED (and possibly the location of the initiating UE 1710). The recipient UE 1720 may send a response communication 1722 to the initiating UE 1710 acknowledging receipt of the communication 1711, indicating that a user of the recipient UE 1720 has CPR training, and indicating an estimated time of arrival at the initiating UE 1710. The AED 1740 may send response communications 1742, 1744 to the initiating UE 1710 and the recipient UE 1730, respectively, indicating a location of the AED 1740. The response communications 1742, 1744 may be a single broadcast communication. The recipient UE 1730 may send a response communication 1732 to the initiating UE 1710 acknowledging receipt of the communication 1712, indicating that a user of the recipient UE 1730 will bring the AED 1740, and indicating an ETA of the user of the recipient UE 1730 with the AED 1740. Any of the entities shown in FIG. 17 could initiate an emergency call with a network entity. Other applications, including other medical applications, are possible. For example, the initiating UE may send a request for medicine, e.g., an epipen for an extreme allergic reaction and/or other medicine for another purpose, e.g., insulin to treat diabetic shock. Further SL communication and/or network communication may be initiated to contact an entity such as a pharmacy for delivery of emergency medicine.

Numerous other applications are possible, leveraging the short-range, rapid nature of SL communications. For example, a person may send a notification of a missing person along with a photo of the missing person (e.g., a missing child at a theme park). Nearby UEs may receive the notification and display the photo and an indication that this person is missing. The notification may include information, such as a location and/or a phone number of the initiating UE, to assist in finding and returning the missing person. The location may be updated over time, and other information provided such as whether the searching person has further information (e.g., likes of the missing person, previous behavior when lost, that the missing person (or pet) can be seen but not reach (e.g., in a tree)). Authorities, e.g., security and/or police (and/or other authority) may be notified by SL and/or via a network such that appropriate personnel and/or equipment may be dispatched to an appropriate location. Family members may communicate with each other rapidly, e.g., to remind a driver to pick a child up from school or another activity, or to remind a family member of something (e.g., to return a book, submit homework, etc.), etc. Neighbors may send notifications, offers, or requests to other neighbors. For example, if a person needs help with a household project, the person may send a request, directed to neighbors only, for assistance such that other nearby UEs within SL range of the initiating UE may receive, but not act upon, the request. For example, the UE 510 may send a neighbor request via sidelink and the UEs 511, 512 belonging to neighbors of the user 520 may respond to the request while the UEs 513, 514 that are within SL range but do not belong to neighbors of the user 520 do not respond (e.g., take any action) based on receipt of the neighbor request from the UE 510. In another example application, the initiating UE may send an SL notification encouraging people to come to a specified location, e.g., to see an entertainer that is or is about to perform. In another example application, an SL notification may be sent to warn against people coming to an area and/or encouraging people to leave the area, e.g., an area where there is danger such as a fire, a flood, a biohazard, a chemical spill, an unsafe environmental hazard, police activity, etc. In another example application, information in a sidelink communication may be relayed in one or more further sidelink communications to expand a reach of a sidelink communication. For example, a code sent from an initiating UE may be passed from one recipient UE to another UE that is beyond the SL range of the initiating UE. Such a code may have numerous purposes, such as allowing a recipient UE to track the location of another UE such as a UE of a child or pet of an owner of the initiating UE. As another example, the code may cause a specified UE to broadcast the location of the specified UE, e.g., a UE of a child or pet such that the child or pet, though possibly moving, can be tracked and located. As another example, an initiating UE may request that an SL communication sent from the initiating UE be relayed. The initiating UE may request a relay of the SL communication due to the initiating UE not having network service (e.g., a network connection). The SL communication sent by the initiating UE may indicate that the initiating UE does not have network service, which may serve as an implicit request to have the SL communication relayed.

Still other applications of sidelink communication may be implemented, e.g., for commercial purposes. For example, a store may broadcast an SL communication with information about a giveaway and/or a discount, e.g., that is available for a limited time and/or for a limited amount of customers. As another example, a shopper may have a UE send (e.g., periodically) an SL request for special offers available. The range limit of an SL communication will inherently limit the number of entities that will respond such that the shopper may avoid having an unmanageable number of responses.

Still other applications of sidelink communication may be implemented, such as applications involving reverse or reciprocal locating. For example, instead of or in addition to a recipient UE determining the location of a work item UE, the work item UE could determine the location of the recipient UE. Thus, for example, the AED 1740 could determine a location of the recipient UE 1730 and send an SL communication to the recipient UE 1730 to take the AED 1740 to the location of the initiating UE 1710. As another example, UEs may provide a joint positioning solution such as one UE that has GNSS information (e.g., measurements) providing the GNSS information to one or more other UEs that lack such information. The other UE(s) may leverage the GNSS information received in order to determine the location(s) of the other UE(s) and/or the UE providing the GNSS information. As another example implementation of reciprocal locating, different UEs may individually obtain locations, e.g., GNSS locations, and share the locations with each other such that a differential positioning may be implemented with the different UEs determining an improved relative position between the UEs. As an example implementation of reciprocal locating, UEs belonging to a parent and a child may locate each other.

Still other applications of sidelink communication may be implemented, such as social networking applications. For example, an SL request may be sent by an initiator looking for someone to go jogging with the initiator, or to have lunch with the initiator, or to study for a class with the initiator, or to discuss a particular topic with the initiator, etc. The request may be limited to a group, e.g., persons that have indicated an interest in the activity and willingness to participate, e.g., likes to jog with others, is taking a particular class and is willing to study with others.

Still other applications of sidelink communication may be implemented, e.g., being initiated automatically by a UE. For example, a sensor may be configured to detect smoke and/or fire, or water, or water leak, or the opening of a portal (e.g., a window or a door) to a house. The sensor may include or be associated with a UE that sends a sidelink communication in response to the sensor detecting of one or more of these conditions. Thus, for example, a neighbor notice may be sent in a sidelink communication such that neighbors to a home that is on fire, being flooded, or being broken into can provide assistance (e.g., help douse a fire, turn off a water supply to the home, photograph a vehicle used by a burglar to assist police in capturing the burglar, etc.). The SL communication to the neighbors may include information, e.g., a code, for accessing the home. Also or alternatively, another UE, e.g., a door opener, may respond to receiving the communication from the initiating device and receiving a response from an authorized UE (e.g., a UE in a neighbor group of the initiating UE) by opening a door to provide access by the neighbor to the home 530.

In addition to the SL communication, the UE may send one or more network-based communications (e.g., cellular-based communications, WAN communications, and/or WiFi communications, etc.) to one or more network entities. The network-based communication may be sent in parallel with the SL communication. For example, an emergency call may be placed through the network while one or more SL communications are sent to request more immediate assistance from nearby UE users. Using SL and network communications may provide one or more of various capabilities such as: real-time local updates and/or action requests; centralized notification and/or action; data gathering and/or monitoring (e.g., over a localized SL ad hoc network); different priority and/or assistance levels; or combinations of any of these. For example, a person may send an SL communication requesting non-emergency help (e.g., to replace a light bulb, jump start a car, troubleshoot a computer, etc.) from nearby persons, such as neighbors, and also send a network inquiry (e.g., a browser search) for professional help (e.g., an electrician, a vehicle towing service, a computer repair service, etc.). As another example, a person may send an SL communication for immediate assistance (e.g., from neighbors for locating a lost pet) and also send a network communication for official assistance (e.g., a notification to a town animal control service and/or a web search for animal recovery services). As another example, an SL communication may be sent for immediate medical assistance (e.g., due to a person falling) and also a network communication for professional assistance (e.g., an emergency notification and/or ambulance request). As another example, an SL communication may be sent for urgent medical assistance (e.g., CPR needed, allergy medicine needed, etc.) and also a network communication for an emergency call (e.g., an emergency notification and/or ambulance request).

Using SL communication may help retain privacy of communications. For example, by avoiding network communications, risk of communications being monitored may be reduced. Privacy may be enhanced by encrypting the SL communications, e.g., as requested by a user. Different levels of privacy may be requested, e.g., with different levels having information not encrypted and broadcast, or not encrypted but peer-to-peer communicated (i.e., without a network) by multicast or unicast, or encrypted.

Sidelink communication may be repeated. For example, an initiating UE and/or a recipient UE may repeatedly send SL communications. The repeated communications may, for example, provide updated location of the UE and/or updated requests (e.g., emergency requests) or other information. Different SL communications may be repeated with different frequencies, e.g., with an emergency request being repeated with a higher frequency (lower periodicity) than a non-emergency request or a service offer, etc. The repeated communications may comprise the same information, different information, or partially the same information and partially different information (e.g., an updated location but the same request for service or the same product or service offer).

Different priority levels may be applied to sidelink communications and/or different assistance levels provided. For example, based on established criteria and a present situation, different actions may be taken in response to a sidelink communication. Thus, different communications may have different levels of priority determining whether an action is taken and if so, what action(s) is(are) taken to provide potentially different levels of assistance (e.g., that a user may be able to provide emergency first aid vs. that a person may be able to deliver medicine but not provide physical care to a patient).

Communication in addition to sidelink communication may be used, e.g., in response to sidelink communication not yielding a desired result within a threshold amount of time, or due to an immediacy of a need such that the time to determine whether sidelink communication is effective is unacceptable (e.g., a medical emergency). For example, data may be gathered from sidelink communications as part of a localized sidelink ad hoc network and the gathered data may be reported to a network entity. The data may be gathered for use in conjunction with the monitored communication (e.g., storing data as to where a lost item was found) and/or for use in crowdsourcing data for any of a variety of uses (e.g., establishing maps of activities of many users). As another example, a network session may be established in parallel to SL communication, e.g., to expedite response, to diversify an assistance request, etc.

Figure 18:
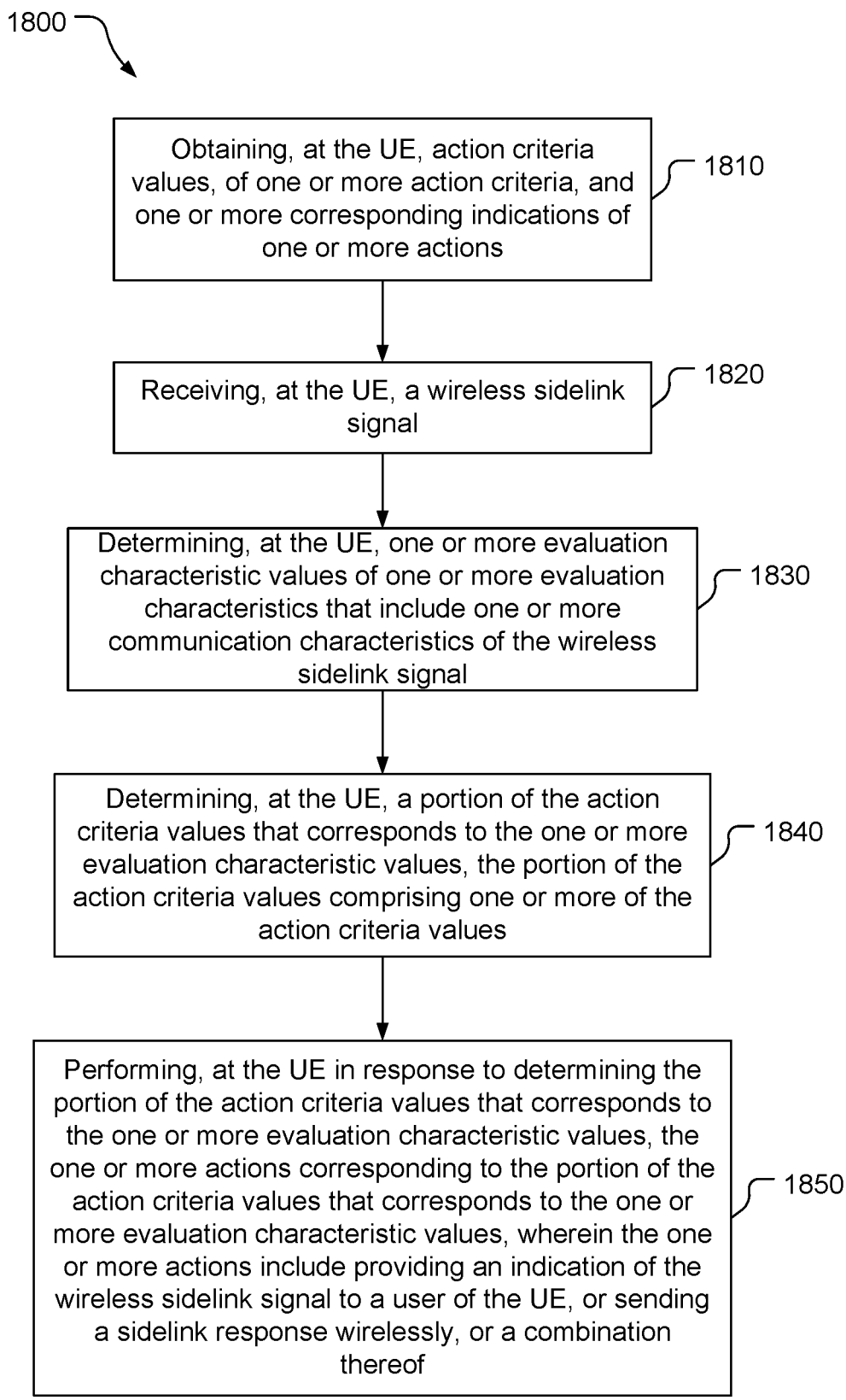
FIG. 18 is a block flow diagram of a method of sidelink communication.

Referring to FIG. 18, with further reference to FIGS. 1-17, a method 1800 of sidelink communication includes the stages shown. The method 1800 is, however, an example only and not limiting. The method 1800 may be altered, e.g., by having stages added, removed, rearranged, combined, performed concurrently, and/or having single stages split into multiple stages.

At stage 1810, the method 1800 includes obtaining, at the UE, one or more action criteria values, of one or more action criteria, and one or more corresponding indications of one or more actions. For example, the SL communication unit 650 may retrieve or access one or more action criteria from the memory 630, e.g., access the criteria set 800. The SL communication unit 650 may access or retrieve default action criteria and/or other action criteria such as action criteria selected or input, e.g., in response to prompts to a user such as prompts shown in any of FIGS. 7A-7F and 10-13. The processor 610, possibly in combination with the memory 630, possibly in combination with the user interface 616, may comprise means for obtaining one or more action criteria values.

At stage 1820, the method 1800 includes receiving, at the UE, a wireless sidelink signal. For example, the first recipient UE 1511, or the recipient UE 1615, or the recipient UE 1720, receives a wireless sidelink signal such as the SL communication 1531, the SL communication 1632, or the SL communication 1711, respectively. The processor 610, possibly in combination with the memory 630, possibly in combination with the wireless interface 620 (e.g., the wireless receiver 244 and the antenna 246) may comprise means for receiving a wireless sidelink signal.

At stage 1830, the method 1800 includes determining, at the UE, one or more evaluation characteristic values of one or more evaluation characteristics that include one or more communication characteristics of the wireless sidelink signal. For example, the SL communication unit 650 may determine a source (e.g., from a source ID in the wireless sidelink signal) of the wireless sidelink signal and/or a communication type of the wireless sidelink signal (e.g., from a communication type indication in the wireless sidelink signal and/or from content (e.g., text of a request) of the wireless sidelink signal). The SL communication unit 650 may also determine one or more other evaluation characteristic values such as those corresponding to action criteria (e.g., UE location, user status, etc.). The processor 610, possibly in combination with the memory 630, may comprise means for determining the one or more evaluation characteristic values.

At stage 1840, the method 1800 includes determining, at the UE, a portion of the one or more action criteria values that corresponds to the one or more evaluation characteristic values, the portion of the one or more action criteria values comprising one or more of the one or more action criteria values. For example, the SL communication unit 650 compares the one or move evaluation characteristic values with the one or more action criteria values to determine which, if any, action criteria value(s) or combination(s) of action criteria values include or otherwise correspond to (e.g., match) the one or more evaluation characteristic values. The SL communication unit 650 may look for the combination(s) of action criteria that includes the greatest number of the evaluation characteristic values and identify the corresponding action(s). For example, for evaluation characteristic values of "family emergency" as the communication type, "spouse" as the communication source, and "at work", the SL communication unit 650 looks for the combination of these values in the action criteria. If multiple combinations are identified (e.g., with the same number of action criteria), then the SL communication unit 650 may identify the action(s) associated with the combination having a highest priority among the combinations found. Similarly, in only one or more action criteria individually correspond to the one or more evaluation characteristics (e.g., only the communication type or only the communication source), then the corresponding action(s) is(are) identified. If multiple individual action criteria values are identified (e.g., the communication type and the communication source, but not in combination), then the action(s) associated with the highest priority action criteria value may be identified to be performed. The processor 610, possibly in combination with the memory 630, may comprise means for determining the portion of the one or more action criteria values that corresponds to the one or more evaluation characteristic values.

At stage 1850, the method 1800 includes performing, at the UE in response to determining the portion of the one or more action criteria values that corresponds to the one or more evaluation characteristic values, the one or more actions corresponding to the portion of the one or more action criteria values that corresponds to the one or more evaluation characteristic values, wherein the one or more actions include providing an indication of the wireless sidelink signal to a user of the UE, or sending a sidelink response wirelessly, or a combination thereof. For example, the UE 600 (e.g., the processor 610 along with the memory 630 and/or the wireless interface 620 and/or the user interface 616 as appropriate) may perform the action(s) identified at stage 1840, the action(s) that is(are) indicated for the one or more action criteria corresponding to the one or more evaluation characteristic values. For example, the processor 610 may cause the user interface 616 to provide a visible, audible, and/or tactile indication of the wireless sidelink signal, e.g., to display text indicative of the wireless sidelink signal, make a sound, vibrate, etc. As another example, the processor 610 may send one or more sidelink response communications via the wireless interface 620, e.g., to the source of the wireless sidelink signal and/or to one or more other entities in addition to or instead of the source of the wireless sidelink signal. The response may be a broadcast sidelink signal, a unicast sidelink signal (indicating a single destination), or a multicast sidelink signal (e.g., indicating a group of destination UEs such as family or neighbors with those group names corresponding to UE IDs). The processor 610 along with the memory 630 and/or the wireless interface 620 and/or the user interface 616 may comprise means for performing the one or more actions corresponding to the portion of the one or more action criteria values that corresponds to the one or more evaluation characteristic values.

Implementations of the method 1800 may include one or more of the following features. In an example implementation, the one or more action criteria comprise a communication source, or a communication type, or any combination thereof. The one or more action criteria may also comprise a status of a user of the UE, or a status of the UE, or a combination thereof.

Also or alternatively, implementations of the method 1800 may include one or more of the following features. In an example implementation, the portion of the one or more action criteria values is a first portion of the one or more action criteria values, and wherein performing the one or more actions includes performing the one or more actions corresponding to the first portion of the one or more action criteria values based on the first portion of the one or more action criteria values having a higher priority than a second portion of the one or more action criteria values, wherein the second portion of the one or more action criteria values also corresponds to the one or more evaluation characteristic values. For example, the processor 610 may identify multiple subsets of action criteria (with a subset possibly including only a single action criterion) and may perform the action(s) indicated for the subset with the highest priority. In another example implementation, the method 1800 may include: producing a request for user input as to one or more skills of the user, or one or more interests of the user, or one or more permissions corresponding to one or more wireless sidelink signal characteristics, or any combination thereof; receiving the user input; and storing, in the UE, one or more indications corresponding to the user input as at least part of the one or more action criteria values. For example, the SL communication unit 650 may instruct the user interface 616 to display prompts, such as those shown any of in FIGS. 7A-7F and 10-13, and/or one or more other requests (e.g., an audible request) for a user to input information that may be used as an action criterion, the user interface 616 may receive responsive user input, and the processor 610 may store one or more indications of the input in the memory 630. The processor 610, possibly in combination with the memory 630, in combination with the user interface 616 may comprise means for producing the request. The user interface 616 may comprise means for receiving the user input. The processor 610 and the memory 630 may comprise means for storing the one or more indications corresponding to the user input.

Also or alternatively, implementations of the method 1800 may include one or more of the following features. In an example implementation, the method 1800 includes responding to determining the portion of the one or more action criteria values that corresponds to the one or more evaluation characteristic values by sending a plurality of wireless sidelink responses to the wireless sidelink signal, where each of the plurality of wireless sidelink responses includes an indication of a location of the UE, or an indication of an estimated travel time between the location of the UE and a location of the source of the wireless sidelink signal, or a combination thereof. For example, the SL communication unit 650 may intermittently (e.g., periodically) send SL communications indicating the location of the UE 1511 and/or an ETA to the location of the initiating UE 1510. The processor 610, possibly in combination with the memory 630, in combination with the wireless interface 620 (e.g., the wireless transmitter 242 and the antenna 246) may comprise means for the stated responding.

Figure 19:
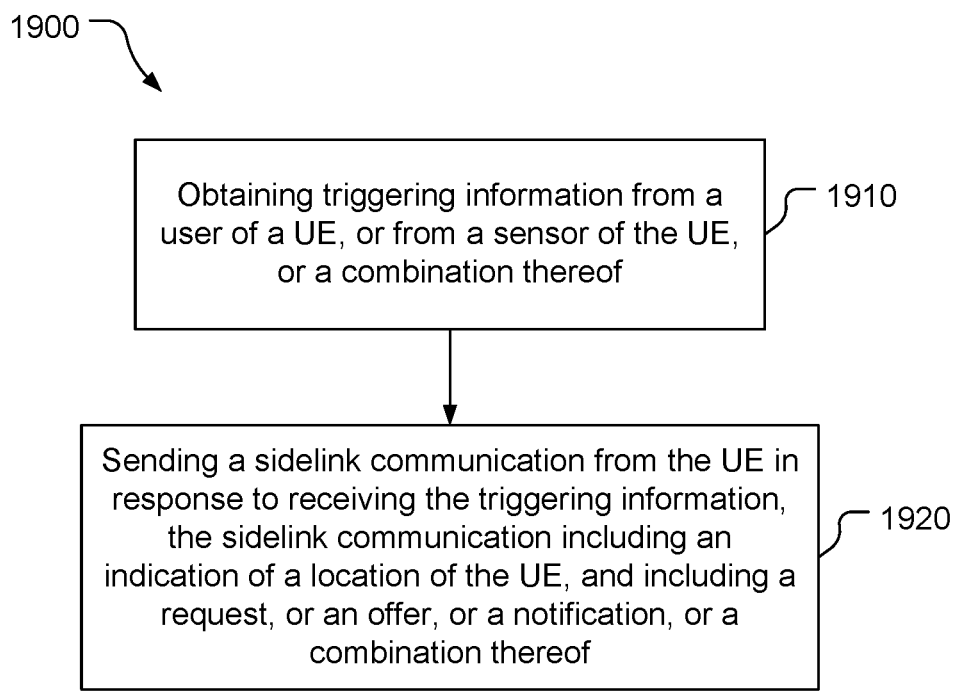
FIG. 19 is a block flow diagram of another method of sidelink communication.

Referring to FIG. 19, with further reference to FIGS. 1-17, a method 1900 of sidelink communication includes the stages shown. The method 1900 is, however, an example only and not limiting. The method 1900 may be altered, e.g., by having stages added, removed, rearranged, combined, performed concurrently, and/or having single stages split into multiple stages.

At stage 1910, the method 1900 includes obtaining triggering information from a user of a UE, or from a sensor of the UE, or a combination thereof. For example, the SL communication unit 650 may receive input from a user through the user interface 616 as to a desired communication (e.g., an emergency notice, a request (e.g., for a service and/or a product), an offer (e.g., of a service and/or a product), a notification (e.g., an event notice, an abduction notice, etc.). Also or alternatively, the SL communication unit 650 may receive input from a sensor of the UE 600, e.g., a smoke detector, a fire detector, a motion detector, a water detector, etc., indicative of detection of smoke, fire, motion, water, etc. The processor 610, possibly in combination with the memory 630, possibly in combination with the user interface 616 and/or a sensor of the UE 600 (e.g., one or more of the sensors 213), may comprise means for obtaining triggering information.

At stage 1920, the method 1900 includes sending a sidelink communication from the UE in response to receiving the triggering information, the sidelink communication including an indication of a location of the UE, and including a request, or an offer, or a notification, or a combination thereof. For example, sidelink communication unit 650 sends an SL communication based on the triggering information. The SL communication includes a location of the UE 600 and includes other content based on the triggering information, e.g., information input through the user interface 616 or information programmed in the memory 630, e.g., an emergency number for an emergency call, a list of contacts for a family communication, etc. The processor 610, possibly in combination with the memory 630, in combination with the wireless interface 620 (e.g., the wireless transmitter 242 and the antenna 246) may comprise means for sending a sidelink communication from the UE.

Implementations of the method 1900 may include one or more of the following features. In an example implementation, the method 1900 includes sending a network communication corresponding to the sidelink communication from the UE based on content of the sidelink communication, or based on a threshold amount of time passing after transmission of the sidelink communication without the UE receiving a response to the sidelink communication, or a combination thereof. For example, the processor 610 sends a cellular, WiFi, and/or WAN communication based on the sidelink communication content (e.g., based on the SL communication being an emergency communication) and/or in response to UE 600 not receiving a response to the SL communication within a threshold time, and thus indicative of a failure of the SL communication to produce a desired result. The network communication may correspond to the SL communication by, for example, containing similar information to the SL communication. The processor 610, possibly in combination with the memory 630, in combination with the wireless interface 620 (e.g., the wireless transmitter 242 and the antenna 246) may comprise means for sending a network communication from the UE. In another example implementation, sending the sidelink communication comprises broadcasting, multicasting, or unicasting the sidelink communication based on an offer type of the sidelink communication, or a request type of the sidelink communication, or a notification type of the sidelink communication, or any combination thereof. As examples, the SL communication unit 650 may broadcast an emergency request for medical aid, multicast a family notification, and unicast a communication indicated by a user as intended for only one recipient. How the SL communication is sent may be based on a default, based on user input via the user interface 616, type of the SL communication, and/or content of the SL communication.

Also or alternatively, implementations of the method 1900 may include one or more of the following features. In an example implementation, the method 1900 further comprises sending a first instruction from the UE to another UE for the other UE to send a location of the other UE wirelessly and repeatedly. For example, in response to an abduction indication, the UE may instruct a nearest UE (presumed to be a UE of the abductor) to repeatedly report a location of the other UE, e.g., without alerting the user of the other UE of such reporting. The processor 610, possibly in combination with the memory 630, in combination with the wireless interface 620 (e.g., the wireless transmitter 242 and the antenna 246) may comprise means for sending the instruction to the other UE. In another example implementation, the method 1900 comprises sending a second instruction to the second UE for the other UE to place an emergency call, or to record video, or to record audio, or any combination thereof. The processor 610 may instruct the other UE to perform other functions that may assist in finding, and holding accountable, a law breaker such as an abductor. The first and second instructions may be sent together, e.g., as part of a single instruction that the other UE interprets to perform various functions such as reporting location, placing an emergency call (e.g., to police), and/or recording video and/or audio.

Also or alternatively, implementations of the method 1900 may include one or more of the following features. In an example implementation, the method 1900 comprises providing an expiration indication to a user of the UE of a threshold amount of time passing after transmission of the sidelink communication without the UE receiving a response to the sidelink communication, the expiration indication comprising a visual indication, or an audible indication, or a tactile indication, or any combination thereof. For example, the processor 610 may cause the user interface 616 to display a visual notice, provide an audible notice via a speaker, and/or to provide a tactile notice such as a vibration of the UE 600 to indicate to a user of the UE 600 that no response to the SL communication has been received. The processor 610, possibly in combination with the memory 630, in combination with the user interface 616 may comprise means for providing an expiration indication to a user of the UE.

Implementation Examples

Implementation examples are provided in the following numbered clauses.

1. A user equipment (UE) comprising:
an input device comprising a user interface, or a sensor, or a combination thereof;
a wireless interface configured to send and receive wireless signals;
a memory; and
a processor communicatively coupled to the input device, the wireless interface, and the memory, and configured to:
obtain triggering information from the input device; and
send a sidelink communication via the wireless interface in response to receiving the triggering information from the input device, the sidelink communication including an indication of a location of the UE, and including a request, or an offer, or a notification, or a combination thereof.

2. The UE of clause 1, wherein the processor is configured to send a network communication via the wireless interface corresponding to the sidelink communication and based on content of the sidelink communication, or based on a threshold amount of time passing after transmission of the sidelink communication without the processor receiving a response to the sidelink communication, or a combination thereof.

3. The UE of clause 1, wherein the processor is configured to broadcast, multicast, or unicast the sidelink communication based on an offer type of the sidelink communication, or a request type of the sidelink communication, or a notification type of the sidelink communication, or any combination thereof.

4. The UE of clause 1, wherein the processor is configured to send a first instruction to an other UE for the other UE to send a location of the other UE wirelessly and repeatedly.

5. The UE of clause 4, wherein the processor is configured to send a second instruction to the other UE for the other UE to place an emergency call, or to record video, or to record audio, or any combination thereof.

6. The UE of clause 1, wherein the UE comprises the user interface, and wherein the processor and the user interface are configured to provide an expiration indication based on a threshold amount of time passing after transmission of the sidelink communication without the processor receiving a response to the sidelink communication, the expiration indication comprising a visual indication, or an audible indication, or a tactile indication, or any combination thereof.

7. A user equipment (UE) communication method comprising:
obtaining triggering information from a user of the UE, or from a sensor of the UE, or a combination thereof; and
sending a sidelink communication from the UE in response to receiving the triggering information, the sidelink communication including an indication of a location of the UE, and including a request, or an offer, or a notification, or a combination thereof.

8. The UE communication method of clause 7, further comprising sending a network communication corresponding to the sidelink communication from the UE based on content of the sidelink communication, or based on a threshold amount of time passing after transmission of the sidelink communication without the UE receiving a response to the sidelink communication, or a combination thereof.

9. The UE communication method of clause 7, wherein sending the sidelink communication comprises broadcasting, multicasting, or unicasting the sidelink communication based on an offer type of the sidelink communication, or a request type of the sidelink communication, or a notification type of the sidelink communication, or any combination thereof.

10. The UE communication method of clause 7, wherein the UE is a first UE, the method further comprising sending a first instruction from the first UE to a second UE for the second UE to send a location of the second UE wirelessly and repeatedly.

11. The UE communication method of claim 10, further comprising sending a second instruction to the second UE for the second UE to place an emergency call, or to record video, or to record audio, or any combination thereof.

12. The UE communication method of clause 7, further comprising providing an expiration indication to a user of the UE of a threshold amount of time passing after transmission of the sidelink communication without the UE receiving a response to the sidelink communication, the expiration indication comprising a visual indication, or an audible indication, or a tactile indication, or any combination thereof.

13. A user equipment (UE) comprising:
means for obtaining triggering information from a user of the UE, or from a sensor of the UE, or a combination thereof; and
means for sending a sidelink communication from the UE in response to receiving the triggering information, the sidelink communication including an indication of a location of the UE, and including a request, or an offer, or a notification, or a combination thereof.

14. The UE of clause 13, further comprising means for sending a network communication corresponding to the sidelink communication from the UE based on content of the sidelink communication, or based on a threshold amount of time passing after transmission of the sidelink communication without the UE receiving a response to the sidelink communication, or a combination thereof.

15. A non-transitory, processor-readable storage medium comprising processor-readable instructions to cause a processor of a user equipment (UE) to:
obtain triggering information from a user of a UE, or from a sensor of the UE, or a combination thereof; and
send a sidelink communication from the UE in response to receiving the triggering information, the sidelink communication including an indication of a location of the UE, and including a request, or an offer, or a notification, or a combination thereof.

16. The storage medium of clause 15, further comprising processor-readable instructions to cause the processor to send a network communication corresponding to the sidelink communication from the UE based on content of the sidelink communication, or based on a threshold amount of time passing after transmission of the sidelink communication without the processor receiving a response to the sidelink communication, or a combination thereof.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment (UE) comprising:
a user interface;
a wireless interface configured to send and receive wireless signals;
a memory; and
a processor communicatively coupled to the user interface, the wireless interface, and the memory, and configured to:
 obtain one or more action criteria values, of one or more action criteria, and one or more corresponding indications of one or more actions;
 receive a wireless sidelink signal via the wireless interface;
 determine one or more evaluation characteristic values of one or more evaluation characteristics that include one or more communication characteristics of the wireless sidelink signal;
 determine a portion of the one or more action criteria values that corresponds to the one or more evaluation characteristic values, the portion of the one or more action criteria values comprising one or more of the one or more action criteria values; and
 perform, in response to determining the portion of the one or more action criteria values that corresponds to the one or more evaluation characteristic values, the one or more actions corresponding to the portion of the one or more action criteria values that corresponds to the one or more evaluation characteristic values, wherein the one or more actions include: providing an indication to the user interface to produce an output; or sending a sidelink response, that is responsive to the wireless sidelink signal, wirelessly via the wireless interface; or a combination thereof.

2. The UE of claim 1, wherein the one or more action criteria comprise a communication source, or a communication type, or any combination thereof.

3. The UE of claim 2, wherein the one or more action criteria comprise a status of a user of the UE, or a status of the UE, or a combination thereof.

4. The UE of claim 1, wherein the portion of the one or more action criteria values is a first portion of the one or more action criteria values, and wherein the processor is further configured to perform the one or more actions corresponding to the first portion of the one or more action criteria values based on the first portion of the one or more action criteria values having a higher priority than a second portion of the one or more action criteria values, wherein the second portion of the one or more action criteria values also corresponds to the one or more evaluation characteristic values.

5. The UE of claim 1, wherein the processor is configured to determine a source of the wireless sidelink signal, or a communication type of the wireless sidelink signal, or a combination thereof, as the one or more evaluation characteristic values.

6. A user equipment (UE) comprising:
a user interface;
a wireless interface configured to send and receive wireless signals;
a memory; and
a processor communicatively coupled to the user interface, the wireless interface, and the memory, and configured to:
  obtain one or more action criteria values, of one or more action criteria, and one or more corresponding indications of one or more actions;
  receive a wireless sidelink signal via the wireless interface;
  determine one or more evaluation characteristic values of one or more evaluation characteristics that include one or more communication characteristics of the wireless sidelink signal;
  determine a portion of the one or more action criteria values that corresponds to the one or more evaluation characteristic values, the portion of the one or more action criteria values comprising one or more of the one or more action criteria values;
  perform, in response to determining the portion of the one or more action criteria values that corresponds to the one or more evaluation characteristic values, the one or more actions corresponding to the portion of the one or more action criteria values that corresponds to the one or more evaluation characteristic values, wherein the one or more actions include: providing an indication to the user interface to produce an output, or sending a sidelink response wirelessly via the wireless interface, or a combination thereof;
  instruct the user interface to produce a request for user input as to one or more skills of the user, or one or more interests of the user, or one or more permissions corresponding to one or more wireless sidelink signal characteristics, or any combination thereof;
  receive the user input from the user interface; and
  store, in the memory, one or more indications corresponding to the user input as at least part of the one or more action criteria values.

7. A user equipment (UE) comprising:
a user interface;
a wireless interface configured to send and receive wireless signals;
a memory; and
a processor communicatively coupled to the user interface, the wireless interface, and the memory, and configured to:
  obtain one or more action criteria values, of one or more action criteria, and one or more corresponding indications of one or more actions;
  receive a wireless sidelink signal via the wireless interface;
  determine one or more evaluation characteristic values of one or more evaluation characteristics that include one or more communication characteristics of the wireless sidelink signal;
  determine a portion of the one or more action criteria values that corresponds to the one or more evaluation characteristic values, the portion of the one or more action criteria values comprising one or more of the one or more action criteria values;
  perform, in response to determining the portion of the one or more action criteria values that corresponds to the one or more evaluation characteristic values, the one or more actions corresponding to the portion of the one or more action criteria values that corresponds to the one or more evaluation characteristic values, wherein the one or more actions include: providing an indication to the user interface to produce an output, or sending a sidelink response wirelessly via the wireless interface, or a combination thereof; and
  respond to determining the portion of the one or more action criteria values that corresponds to the one or more evaluation characteristic values by sending a plurality of wireless sidelink responses to the wireless sidelink signal via the wireless interface, wherein each of the plurality of wireless sidelink responses includes an indication of a location of the UE, or an indication of an estimated travel time between the location of the UE and a location of a source of the wireless sidelink signal, or a combination thereof.

8. A user equipment (UE) comprising:
means for obtaining one or more action criteria values, of one or more action criteria, and one or more corresponding indications of one or more actions;
means for receiving a wireless sidelink signal;
means for determining one or more evaluation characteristic values of one or more evaluation characteristics that include one or more communication characteristics of the wireless sidelink signal;
means for determining a portion of the one or more action criteria values that corresponds to the one or more evaluation characteristic values, the portion of the one or more action criteria values comprising one or more of the one or more action criteria values; and
means for performing, in response to determining the portion of the one or more action criteria values that corresponds to the one or more evaluation characteristic values, the one or more actions corresponding to the portion of the one or more action criteria values that corresponds to the one or more evaluation characteristic values, wherein the one or more actions include: providing an indication of the wireless sidelink signal to a user of the UE; or sending a sidelink response, that is responsive to the wireless sidelink signal, wirelessly; or a combination thereof.

9. The UE of claim 8, wherein the one or more action criteria comprise a communication source, or a communication type, or any combination thereof.

10. The UE of claim 9, wherein the one or more action criteria comprise a status of a user of the UE, or a status of the UE, or a combination thereof.

11. The UE of claim 8, wherein the portion of the one or more action criteria values is a first portion of the one or more action criteria values, and wherein the means for performing the one or more actions include means for performing the one or more actions corresponding to the first portion of the one or more action criteria values based on the first portion of the one or more action criteria values having a higher priority than a second portion of the one or more action criteria values, wherein the second portion of the one or more action criteria values also corresponds to the one or more evaluation characteristic values.

12. The UE of claim 8, wherein the means for determining the one or more evaluation characteristic values include means for determining a source of the wireless sidelink signal, or a communication type of the wireless sidelink signal, or a combination thereof, as the one or more evaluation characteristic values.

13. A user equipment (UE) comprising:
means for obtaining one or more action criteria values, of one or more action criteria, and one or more corresponding indications of one or more actions;
means for receiving a wireless sidelink signal;
means for determining one or more evaluation characteristic values of one or more evaluation characteristics that include one or more communication characteristics of the wireless sidelink signal;
means for determining a portion of the one or more action criteria values that corresponds to the one or more evaluation characteristic values, the portion of the one or more action criteria values comprising one or more of the one or more action criteria values;
means for performing, in response to determining the portion of the one or more action criteria values that corresponds to the one or more evaluation characteristic values, the one or more actions corresponding to the portion of the one or more action criteria values that corresponds to the one or more evaluation characteristic values, wherein the one or more actions include providing an indication of the wireless sidelink signal to a user of the UE, or sending a sidelink response wirelessly, or a combination thereof;
means for producing a request for user input as to one or more skills of the user, or one or more interests of the user, or one or more permissions corresponding to one or more wireless sidelink signal characteristics, or any combination thereof;
means for receiving the user input; and
means for storing one or more indications corresponding to the user input as at least part of the one or more action criteria values.

14. A user equipment (UE) comprising:
means for obtaining one or more action criteria values, of one or more action criteria, and one or more corresponding indications of one or more actions;
means for receiving a wireless sidelink signal;
means for determining one or more evaluation characteristic values of one or more evaluation characteristics that include one or more communication characteristics of the wireless sidelink signal;
means for determining a portion of the one or more action criteria values that corresponds to the one or more evaluation characteristic values, the portion of the one or more action criteria values comprising one or more of the one or more action criteria values;
means for performing, in response to determining the portion of the one or more action criteria values that corresponds to the one or more evaluation characteristic values, the one or more actions corresponding to the portion of the one or more action criteria values that corresponds to the one or more evaluation characteristic values, wherein the one or more actions include providing an indication of the wireless sidelink signal to a user of the UE, or sending a sidelink response wirelessly, or a combination thereof; and
means for responding to determining the portion of the one or more action criteria values that corresponds to the one or more evaluation characteristic values by sending a plurality of wireless sidelink responses to the wireless sidelink signal, wherein each of the plurality of wireless sidelink responses includes an indication of a location of the UE, or an indication of an estimated travel time between the location of the UE and a location of a source of the wireless sidelink signal, or a combination thereof.

15. A method of sidelink communication at a user equipment (UE), the method comprising:
obtaining, at the UE, one or more action criteria values, of one or more action criteria, and one or more corresponding indications of one or more actions;
receiving, at the UE, a wireless sidelink signal;
determining, at the UE, one or more evaluation characteristic values of one or more evaluation characteristics that include one or more communication characteristics of the wireless sidelink signal;
determining, at the UE, a portion of the one or more action criteria values that corresponds to the one or more evaluation characteristic values, the portion of the one or more action criteria values comprising one or more of the one or more action criteria values; and
performing, at the UE in response to determining the portion of the one or more action criteria values that corresponds to the one or more evaluation characteristic values, the one or more actions corresponding to the portion of the one or more action criteria values that corresponds to the one or more evaluation characteristic values, wherein the one or more actions include: providing an indication of the wireless sidelink signal to a user of the UE; or sending a sidelink response, that is responsive to the wireless sidelink signal, wirelessly; or a combination thereof.

16. The method of claim 15, wherein the one or more action criteria comprise a communication source, or a communication type, or any combination thereof.

17. The method of claim 16, wherein the one or more action criteria comprise a status of a user of the UE, or a status of the UE, or a combination thereof.

18. The method of claim 15, wherein the portion of the one or more action criteria values is a first portion of the one or more action criteria values, and wherein performing the one or more actions includes performing the one or more actions corresponding to the first portion of the one or more action criteria values based on the first portion of the one or more action criteria values having a higher priority than a second portion of the one or more action criteria values, wherein the second portion of the one or more action criteria values also corresponds to the one or more evaluation characteristic values.

19. The method of claim 15, wherein determining the one or more evaluation characteristic values includes determining a source of the wireless sidelink signal, or a communication type of the wireless sidelink signal, or a combination thereof, as the one or more evaluation characteristic values.

20. A method of sidelink communication at a user equipment (UE), the method comprising:
obtaining, at the UE, one or more action criteria values, of one or more action criteria, and one or more corresponding indications of one or more actions;
receiving, at the UE, a wireless sidelink signal;
determining, at the UE, one or more evaluation characteristic values of one or more evaluation characteristics that include one or more communication characteristics of the wireless sidelink signal;
determining, at the UE, a portion of the one or more action criteria values that corresponds to the one or more evaluation characteristic values, the portion of the one or more action criteria values comprising one or more of the one or more action criteria values;

performing, at the UE in response to determining the portion of the one or more action criteria values that corresponds to the one or more evaluation characteristic values, the one or more actions corresponding to the portion of the one or more action criteria values that corresponds to the one or more evaluation characteristic values, wherein the one or more actions include: providing an indication of the wireless sidelink signal to a user of the UE, or sending a sidelink response wirelessly, or a combination thereof;

producing a request for user input as to one or more skills of the user, or one or more interests of the user, or one or more permissions corresponding to one or more wireless sidelink signal characteristics, or any combination thereof;

receiving the user input; and storing, in the UE, one or more indications corresponding to the user input as at least part of the one or more action criteria values.

21. A method of sidelink communication at a user equipment (UE), the method comprising:

obtaining, at the UE, one or more action criteria values, of one or more action criteria, and one or more corresponding indications of one or more actions;

receiving, at the UE, a wireless sidelink signal;

determining, at the UE, one or more evaluation characteristic values of one or more evaluation characteristics that include one or more communication characteristics of the wireless sidelink signal;

determining, at the UE, a portion of the one or more action criteria values that corresponds to the one or more evaluation characteristic values, the portion of the one or more action criteria values comprising one or more of the one or more action criteria values;

performing, at the UE in response to determining the portion of the one or more action criteria values that corresponds to the one or more evaluation characteristic values, the one or more actions corresponding to the portion of the one or more action criteria values that corresponds to the one or more evaluation characteristic values, wherein the one or more actions include: providing an indication of the wireless sidelink signal to a user of the UE, or sending a sidelink response wirelessly, or a combination thereof; and responding to determining the portion of the one or more action criteria values that corresponds to the one or more evaluation characteristic values by sending a plurality of wireless sidelink responses to the wireless sidelink signal, wherein each of the plurality of wireless sidelink responses includes an indication of a location of the UE, or an indication of an estimated travel time between the location of the UE and a location of a source of the wireless sidelink signal, or a combination thereof.

22. A non-transitory, processor-readable storage medium comprising processor-readable instructions to cause a processor, of a user equipment (UE), to:

obtain one or more action criteria values, of one or more action criteria, and one or more corresponding indications of one or more actions;

receive a wireless sidelink signal;

determine one or more evaluation characteristic values of one or more evaluation characteristics that include one or more communication characteristics of the wireless sidelink signal;

determine a portion of the one or more action criteria values that corresponds to the one or more evaluation characteristic values, the portion of the one or more action criteria values comprising one or more of the one or more action criteria values; and perform, in response to determining the portion of the one or more action criteria values that corresponds to the one or more evaluation characteristic values, the one or more actions corresponding to the portion of the one or more action criteria values that corresponds to the one or more evaluation characteristic values, wherein the one or more actions include: providing an indication of the wireless sidelink signal to a user of the UE; or sending a sidelink response, that is responsive to the wireless sidelink signal, wirelessly; or a combination thereof.

* * * * *